US009253786B2

(12) United States Patent
Kazmi et al.

(10) Patent No.: US 9,253,786 B2
(45) Date of Patent: Feb. 2, 2016

(54) FIRST NETWORK NODE AND A SECOND NETWORK NODE AND METHODS THEREIN

(75) Inventors: Muhammad Kazmi, Bromma (SE); Farshid Ghasemzadeh, Sollentuna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 244 days.

(21) Appl. No.: 13/985,856

(22) PCT Filed: Feb. 15, 2012

(86) PCT No.: PCT/SE2012/050156
§ 371 (c)(1),
(2), (4) Date: Aug. 15, 2013

(87) PCT Pub. No.: WO2012/112112
PCT Pub. Date: Aug. 23, 2012

(65) Prior Publication Data
US 2013/0322395 A1    Dec. 5, 2013

Related U.S. Application Data

(60) Provisional application No. 61/443,130, filed on Feb. 15, 2011.

(51) Int. Cl.
*H04L 12/801* (2013.01)
*H04L 12/26* (2006.01)
(Continued)

(52) U.S. Cl.
CPC ............ *H04W 72/082* (2013.01); *H04W 28/16* (2013.01); *H04W 36/24* (2013.01); *H04W 72/0426* (2013.01); *H04W 88/10* (2013.01); *H04W 92/20* (2013.01)

(58) Field of Classification Search
CPC ....... H04L 47/10; H04L 43/50; H04W 80/04; H04W 88/06; H04W 28/04; H04W 72/04
USPC .......................................... 370/252, 328, 329
See application file for complete search history.

(56) References Cited

U.S. PATENT DOCUMENTS 4,435,841 A * 3/1984 Dobrovolny ............. H03H 7/01
333/103
5,265,151 A * 11/1993 Goldstein ............... G01R 29/26
375/222

(Continued)

FOREIGN PATENT DOCUMENTS

| WO | 2009157829 A1 | 12/2009 |
| WO | WO 2010071547 * | 6/2010 |
| WO | 2010151849 A2 | 12/2010 |

OTHER PUBLICATIONS

3GPP Work Item Description "Multi-standard radio Base Station RF requirements for non-contiguous spectrum deployments", 2013, 5 pages.

(Continued)

*Primary Examiner* — Ronald B Abelson
(74) *Attorney, Agent, or Firm* — Rothwell, Figg, Ernst & Manbeck, P.C.

(57) ABSTRACT

A method in a second network node (13,23) (eNodeB,BTS) for transmitting signals to and receiving signals from a user equipment (10) in a cellular radio system. The second network node (2nd eNodeB, BTS) signals (sends, transmits) an indicator to a first network node, i.e. RNC or first EnodeB or BTS (12,22, 15) in the cellular radio system, which indicator indicates an impact of an intermodulation (passive intermodulation, PIM, product) caused by a transmission from a transmitter in the second network node (second eNodeB or BTS) (13,23) on a receiver in the second network node (second EnodeB or BTS) (13,23).

36 Claims, 19 Drawing Sheets

(51) Int. Cl.
*H04W 80/04* (2009.01)
*H04W 88/06* (2009.01)
*H04W 28/04* (2009.01)
*H04W 72/04* (2009.01)
*H04W 72/08* (2009.01)
*H04W 88/10* (2009.01)
*H04W 92/20* (2009.01)
*H04W 28/16* (2009.01)
*H04W 36/24* (2009.01)

(56) References Cited

U.S. PATENT DOCUMENTS

| | | | | |
|---|---|---|---|---|
| 5,533,030 | A * | 7/1996 | Schiffel | H04W 84/14 370/481 |
| 6,070,091 | A * | 5/2000 | Hogevik | H04B 17/345 455/296 |
| 8,204,004 | B2 * | 6/2012 | Hamamoto et al. | 370/329 |
| 2004/0102189 | A1 * | 5/2004 | Shurvinton et al. | 455/422.1 |
| 2004/0203804 | A1 | 10/2004 | Merwe | |
| 2005/0249322 | A1 * | 11/2005 | Gerlach | 375/355 |
| 2006/0014554 | A1 * | 1/2006 | Gerlach | 455/501 |
| 2006/0068800 | A1 | 3/2006 | Ruelke et al. | |
| 2008/0242308 | A1 * | 10/2008 | Gunnarsson et al. | 455/450 |
| 2009/0088178 | A1 * | 4/2009 | Jugl et al. | 455/453 |
| 2010/0075654 | A1 * | 3/2010 | Cheng | 455/419 |
| 2010/0075709 | A1 * | 3/2010 | Nakano et al. | 455/522 |
| 2010/0167743 | A1 | 7/2010 | Palanki et al. | |

OTHER PUBLICATIONS

3GPP Work Item Description "Multi-standard radio Base Station RF requirements for non-contiguous spectrum deployments—core part", 2013, 4 pages.

3GPP Work Item Description "Multi-standard radio Base Station RF requirements for non-contiguous spectrum deployments—performance part", 2013, 5 pages.

3rd Generation Partnership Project; Technical Specification Group Radio Access Network; E-UTRA, UTRA and GSM/EDGE; Multi-Standard Radio (MSR) Base Station (BS) radio transmission and reception (Release 10), 3GPP TS 37.104 V10.4.0, 2011, 58 pages.

Ericsson: "On Passive Intermodulation (PIM) for MSR-NC" 3GPP Draft; R4-111321, 3rd Generation Partnership Project (3GPP), Mobile Competence Centre, vol. RAN WG4, 2011, 6 pages.

Nash, "Intermodulation Distortion Problems at UMTS Cell Sites" XP55030759, 2010, retrieved from the internet: http://www.aeroflex.com/ats/products/prodfiles/articles/8814/Intermod.pdf, 10 pages.

Baghel et al. "Coexistence Possibilities of LTE with ISM Technologies and GNSS", 2011 National Conference on Communications (NCC), XP55001826, 5 pages.

Samsung: "Possible TDM Solution for LTE, WiFi and BT In-device Coexistence" 3GPP Draft; R2-105572, 3rd Generation Partnership Project (3GPP), Mobile Competence Centre, vol. RAN WG2, 2010, 5 pages.

Motorola: "Solution Directions for LTE-ISM Coexistence" 3GPP Draft; R2-105712, 3rd Generation Partnership Project (3GPP), Mobile Competence Centre, vol. RAN WG2, 2010, 6 pages.

* cited by examiner

FIRST NETWORK NODE AND A SECOND NETWORK NODE AND METHODS THEREIN

CROSS REFERENCE TO RELATED APPLICATION(S)

This application is a 35 U.S.C. §371 National Phase Entry Application from PCT/SE2012/050156, filed Feb. 15, 2012, designating the United States, and also claims the benefit of U.S. Provisional Application No. 61/443,130, filed Feb. 15, 2011. The disclosures of both applications are incorporated herein in their entirety by reference.

TECHNICAL FIELD

Embodiments herein relate to a first and a second network node and methods therein. In particular, embodiments herein pertain for performing radio resource management in a radio communication system.

BACKGROUND

In a typical cellular radio system, wireless terminals (also known as mobile stations and/or user equipment units (UEs)) communicate via a radio access network (RAN) to one or more core networks. The wireless terminals can be mobile stations or user equipment units (UE) such as mobile telephones, "cellular" telephones", and laptops with wireless capability, e.g., mobile termination, and thus can be, for example, portable, pocket, hand-held, computer-included, or car-mounted mobile devices which communicate voice and/or data via radio access network.

The radio access network (RAN) of the cellular radio system covers a geographical area which is divided into cell areas, with each cell area being served by a base station, e.g., a radio base station (RBS), which in some networks is also called "NodeB" or "B node". A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions, particularly earlier versions, of the radio access network, several base stations are typically connected, e.g., by landlines or microwave, to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. Universal Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies.

Long Term Evolution (LTE) is a variant of a 3GPP radio access technology wherein the radio base station nodes are connected directly to a core network rather than to radio network controller (RNC) nodes. In general, in LTE the functions of a radio network controller (RNC) node are performed by the radio base station nodes. As such, the radio access network (RAN) of an LTE system has an essentially a "flat" architecture comprising radio base station nodes without reporting to radio network controller (RNC) nodes as opposed to a hierarchical architecture comprising the RNC.

Multi Standard Radio (MSR) Base Station (BS) Overview

A multi-standard radio base station comprises common radio frequency (RF) components, such as power amplifiers, RF filters, and similar, which may be used to operate: More than one radio access technology (RAT); or More than one carrier within the same radio access technology. More specifically the multi-standard radio (MSR) base station is also termed as multi-carrier multi-standard radio (MC-MSR) base station due to the fact that it may comprise a single radio access technology (RAT) with more than one carrier. Hence, single radio access technology (RAT) multi-standard radio (MSR) is a special case of the multi-standard radio (MSR). Furthermore a special case of multi-standard radio (MSR) may also comprise a base station which supports a single carrier within a radio access technology (RAT), i.e., a single carrier single RAT multi-standard radio (MSR) base station.

Multi-carrier multiple RAT (MC-MR) is another term used for the multi-standard radio (MSR). Nonetheless for simplicity and consistency reasons the term multi-standard radio (MSR) is used herein to refer to any base station which has common radio parts to operate one or more carriers, which in turn may belong to the same or different radio access technologies (RATs).

Multi-Standard Radio (MSR) Base Station Scenarios

A multi-standard radio (MSR) base station typically supports either full duplex division (FDD) RATs or time division duplex (TDD) RATs, e.g., all RATs in one multi-standard radio (MSR) are either FDD or TDD. Note that Half Duplex FDD (HD-FDD) is a special case of the FDD. This means HD-FDD, e.g. GSM/Enhanced Data Rates for GSM Evolution (EDGE), belongs to FDD multi-standard radio (MSR) base station. The HD-FDD may also be supported for certain bands for Enhanced (E)-UTRA FDD or for any FDD based technologies.

The technology disclosed herein also applies to the multi-standard radio (MSR) supporting any combination of FDD, HD-FDD and TDD RATs.

Until now the following MSR base stations and their requirements are specified: FDD Scenarios The FDD scenarios comprise of MSR supporting one or more of the following RATs: Global System for Mobile telecommunications, (GSM)/GSM EDGE Radio Access Network, GERAN, EDGE, UTRA FDD and E-UTRA FDD.

The operating frequency bands specified in 3GPP specification are common for the UTRA FDD and E-UTRA FDD technologies. For example both UTRA FDD and E-UTRA FDD can operate in band 1, e.g. 2.1 GHz. However all UTRA FDD and E-UTRA FDD bands are not specified for the GSM/EDGE operation. Nonetheless some of the GSM/EGDE/GERAN bands are also specified for the UTRA FDD and E-UTRA FDD; examples of such common bands are: UTRA FDD/E-UTRA FDD band 3, e.g. 1800 MHz, and band 8, e.g. 900 MHz.

For simplicity the term GSM is used, which covers also EDGE and other possible GSM evolutions.

Hence the FDD multi-standard radio (MSR) scenarios are classified into the following two frequency band categories:

MSR frequency band category #1 (BC1): Bands supporting FDD MSR for UTRA FDD and E-UTRA FDD operation e.g. bands 1, 10, 13 and similar.

MSR frequency band category #2 (BC2): Bands supporting FDD MSR for GSM, UTRA FDD and E-UTRA FDD operation e.g. bands 2, 3, 5, 8 and similar.

Even in case of MSR BC#2, in accordance with the operator deployment scenario the MSR BS comprising of the subset of the RATs can be developed. For example a specific MSR BS based on BC#2 may support GSM and UTRA FDD in band 2 in case operator uses only these two RATs.

In future the FDD multi-standard radio (MSR) base station comprising of other FDD technologies may also be introduced. Examples of these scenarios may comprise of any combination of the following FDD/HD-FDD RATs:

E-UTRA FDD and 3GPP2 Code Division Multiple Access (CDMA) technologies, e.g. CDMA2000 1×Radio Transmission Technology (RTT) and High Rate Packet Data (HRPD), E-UTRA FDD, UTRA FDD and 3GPP2 CDMA technologies, e.g. CDMA2000 1×RTT and HRPD, E-UTRA FDD, UTRA FDD, GSM and 3GPP2 CDMA technologies, e.g. CDMA2000 and HRPD.

Similarly the technology disclosed herein also applies to multi-standard radio (MSR) comprising of other technologies, e.g., Worldwide Interoperability for Microwave Access (WiMax), Wireless Local Area Network (WLAN) and their combination with 3GPP and/or 3GPP2 technologies.

TDD Scenarios

The TDD scenarios comprise of MSR supporting one or more of the following RATs: UTRA TDD and E-UTRA TDD.

The operating frequency bands specified in 3GPP specification are generally common for the UTRA TDD and E-UTRA TDD technologies. For example both UTRA TDD and E-UTRA TDD can operate in band 38, e.g. 2.6 GHz.

Hence the TDD MSR scenarios are classified into the following frequency band category:

MSR frequency band category #3 (BC3): Bands supporting TDD MSR for UTRA FTDD and E-UTRA TDD operation, e.g., bands 33, 38, 40, and similar.

MSR BS Requirements

Thanks to the common radio parts, the multi-standard radio (MSR) base station is required to meet the generic radio requirements, which apply for all RATs and for base stations configured for both multi-RAT and single-RAT operation. Example of generic radio requirements are unwanted emissions, spurious emissions, out-of-band blocking, and similar.

In addition there are requirements that apply only to certain MSR base station categories/types. For example some of the requirements may be specific to the single RAT GERAN MSR base station. Similarly modulation quality requirements, e.g., error vector magnitude (EVM)) specific to each RAT needs to be fulfilled by the corresponding RAT.

MSR Base Station Classes

The MSR base station may have the same classes as defined for non-MSR base station, e.g., wide area MSR base station, medium range MSR base station, local area MSR base station, and home MSR base station, for example. Different maximum output power levels are used for different base station classes.

The wide area MSR base station, medium range MSR base station, local area MSR base station and home MSR base station are typically deployed to serve macro cells, micro cells, pico cells and home/office environments respectively. The MSR base station may also be general purpose base station, which is typically used to serve wide range of environment or hybrid environment.

MSR Base Station Classification

The MSR base station may also be classified whether the carriers in a MSR base station using the common radio parts are contiguous or non-contiguous within the MSR bandwidth. Both of them may support different combination of RATs as explained in previous sections.

Contiguous Multi-Standard Radio (MSR)

FIG. 1 shows an example of a distribution of the carriers and RATs in a contiguous MSR base station. The symbols shown in FIG. 1 are defined in section 3 in 3GPP TS 37.104 version 9.3.0 figure 3.2-1. $F_{C, low}$ is a Center frequency of the lowest transmitted/received carrier. $F_{C, high}$ is a center frequency of the highest transmitted/received carrier. $F_{offset, RAT, low}$ is a frequency offset from $F_{C, low}$ to the lower RF bandwidth edge ($F_{BW,RF,low}$) for a specific RAT. $F_{offset, RAT, high}$ is a frequency offset from $F_{C, high}$ to the upper RF bandwidth edge ($F_{BW,RF,high}$) for a specific RAT. A key characteristic of the contiguous MSR is that all the carriers/RATs are contiguous in frequency domain. It is illustrated in FIG. 1 a frequency block containing 3 contiguous set of carriers/RATs.

Non-Contiguous Multi-Standard Radio (MSR)

The non-contiguous MSR base station is being standardized in 3GPP. FIG. 2 shows an example of the distribution of the carriers and RATs in a non-contiguous MSR (NC-MSR) base station. FIG. 2 shows that the NC-MSR base station comprises of two or more sub-blocks of frequency-containing contiguous carriers/RATs separated by empty slots in frequency domain. Each sub-frequency block consists of contiguous set of carriers, which in turn may belong to the same RAT or different RAT, e.g. a combination of GSM and UTRA/E-UTRA.

In empty slots in the frequency domain another operator may operate. Therefore emissions in the empty slots need to be maintained below the limit as required by the regulatory radio requirements.

The key characteristic of the NC-MSR is that all the carriers/RATs within the overall block of frequency, i.e. the non-contiguous block, share the common radio parts. Hence the generic radio requirements are being defined for all carriers/RATs within the non-contiguous frequency block of NC-MSR.

It should be noted that single RAT BS, e.g., supporting only UTRA FDD or only E-UTRA FDD, may also comprise of non-contiguous carriers. In principle this is a special case of NC-MSR BS, which can also support single RAT scenario in addition to the multi-RAT scenario. For example a single RAT NC-MSR BS may comprise of all non-contiguous block of spectrum belonging to HSPA carriers. In another example a single RAT NC-MSR BS may comprise of all non-contiguous block of spectrum belonging to LTE carriers.

Characteristics of Frequency Bands

A large number of frequency bands have been specified for the MSR nodes, e.g., MSR base station, operation. There may also be large difference between the frequencies of different bands. For instance even in the same region E-UTRA band 1 and E-UTRA band 8 operate in 2 GHz and 900 MHz respectively. Similarly E-UTRA band 2 and band 13 operate in frequency range corresponding to 1900 MHz and 700 MHz respectively in the same region. Another example with significant frequency difference is that of 800 MHz and 3.5 GHz bands, which may also operate in the same region. Secondly the dependency of carrier frequency on the coverage or path loss is well known. The coverage of higher frequency band, e.g., 2 GHz, is worse than that of the lower frequency band e.g., 900 MHz. Furthermore the impact of the transmitter noise to the own receiver is highly dependent upon the duplex gap of the FDD frequency bands. For instance the receiver of the MSR BS operating with FDD frequency bands with smaller duplex gaps is prone to receiving more significant noise or any signals from its own transmitter. Since frequency bands are pre-defined in the standard, hence the corresponding duplex gap is also pre-determined by the MSR node.

Examples of MSR FDD frequency bands with smaller and larger duplex gaps are shown in FIG. 3 and FIG. 4 respectively. In FIG. 3 the duplex gap is 15 MHz and in FIG. 4 the duplex gap is 130 MHz between the uplink and down link frequency bands.

Inter-Modulation (IM) Products in MSR

In general the Inter-Modulation (IM) products occur due to the non-linear characteristics of the devices. For example the IM products are generated when the signal passes through an RF circuitry such as power amplifiers, RF filters, antennas, etc. The Inter-modulation (IM) products are of different orders, e.g., IM2, IM3, IM5, etc. The Inter-modulation (IM) power beyond IM3 is generally very low. Thus for simplicity the IM beyond IM3 are generally ignored. This is further elaborated further below.

Passive Inter-Modulation (PIM) products are of a specific type of IM. The Passive Inter-Modulation (PIM) occurs due to the non-linear nature of the passive RF components in the devices. The Passive Inter-Modulation (PIM) products have traditionally been one of the main concerns in the cellular networks. The Passive Inter-Modulation (PIM) originating from the transmitter (TX) of the device can cause severe noise into the own receiver (RX). This degrades the receiver performance.

In e.g. the GSM networks the Passive Inter-Modulation (PIM) was handled initially with non-duplex equipment. This approach gives an isolation of at least 30 dB between the receiver (RX) and transmitter (TX). For the duplex equipment the Passive Inter-Modulation (PIM) was mitigated with frequency planning and by using frequency hopping which was introduced later.

For broadband systems like UTRA or E-UTRA due to the carriers with low power spectral density (PSD) and limited RF bandwidth (RFBW), the higher order Inter-modulation (IM) did not hit its own receiver band and thus the passive IM did not contribute to any degradation of the receiver sensitivity. The PIM products can be generated from the antenna port of the duplexer in the base station (BS) all the way up to the antennas including connectors, jumper cable, feeder cables, site equipment and antennas as shown in FIG. 5. Some of the mechanisms or sources behind passive IM generation are as following:

Corrosion, Oxides
Dissimilar metals in contact to each other
Magnetic materials in the signal path
Low contact pressure and lower contact area
Debris, pollution and dust at the contact areas
Vibration
Temperature variation Intermodulation products occur at frequencies determined by an expression $|\pm mf_1 \pm nf_2|$ where f1 and f2 denote the carrier center frequency and the order of Inter-modulation (IM) products is (m+n). The third order IM products, aka IM3, have the highest power level while for higher orders IM, i.e. above IM3, the power level gradually decreases.

One additional aspect for NC-MSR due to multi-RAT operation is that for narrow bandwidth systems, like GSM (GSM carrier BW is 200 KHz), the IM products are also of narrow bandwidth while the IM products from wide bandwidth systems (e.g. HSPA, LTE etc) or combination of wide bandwidth/narrow bandwidth for multi-RAT operation would be of broad bandwidth. This is illustrated in FIG. 6. A rise in noise in frequency domain due to IM is illustrated over frequency band $f_{IM}$. This is not noticed in the downlink since the DL is of narrow bandwidth.

The Inter-modulation (IM) products are thus dependent upon a number of factors including number of carriers, type of carrier (modulation, amplitude components of carrier, e.g., peak to average, bandwidth, and output power per carrier type etc) and the frequency relation between carriers.

Empirical studies have shown that the level of IM products is higher for non-contiguous cases compared to contiguous scenarios.

Multi-Standard Radio (MSR) Bandwidth (BW)

The MSR bandwidth or more specifically the MSR RF bandwidth (RF) can be determined by taking into account the following factors:

Characteristics of the frequency band
Impact of IM products, e.g., passive IM3, on the own receiver of the MSR node
Output power per carrier type of aggregated output power, e.g., total average power
The transmission and reception bandwidths are typically same. But they may also be different.

Considering the frequency domain relation for intermodulation generation, the existing paired frequency bands, e.g., band 1, band 7, or similar, may be divided into two categories. In one category the relation between the bandwidth and the duplex gap of the band at the transmitter would never generate IM3 products in its own receiver. In the second category of the frequency bands the own receiver of the base station would suffer sensitivity degradation due to the third order IM (IM3) products. Therefore receiver sensitivity degradation depends upon the size of the declared MSR bandwidth. The MSR RF bandwidth (RFBW) meets the RF bandwidth of the RF components of the MSR node. The examples of RF components are power amplifier, RF filters, receive and transmit antennas, etc.

Table 1 summarizes the IM3 analysis for the paired band, i.e. FDD bands, while table 2 gives the maximum BW which would not cause IM3 in the own receiver for the concerned bands. In other words, Table 2 provides IM3 analysis for existing MSR bands, Paired bands in MSR comprising of E-UTRA, UTRA and GSM/EDGE. There are also few new bands which are being currently standardized, e.g., band 25, which also would suffer from IM3 problem, e.g., receiver degradation.

Table 2 gives specific examples of the MSR BW for frequency bands with narrow duplex gap. Table 2 provides maximum RFBW to avoid IM3 for concerned bands.

TABLE 1

IM3 analysis for existing MSR bands, Paired bands in MSR comprising of E-UTRA, UTRA and GSM/EDGE. Digital Cellular Service is denoted DCS and Personal Communication service is denoted PCS.

| MSR and E-UTRA Band number | UTRA Band number | GSM/EDGE Band designation | Uplink (UL) BS receive UE transmit | Downlink (DL) BS transmit UE receive | Duplex gap size in relation to band size |
|---|---|---|---|---|---|
| 1 | I | — | 1920 MHz-1980 MHz | 2110 MHz-2170 MHz | Large |
| 2 | II | PCS 1900 | 1850 MHz-1910 MHz | 1930 MHz-1990 MHz | Small |
| 3 | III | DCS 1800 | 1710 MHz-1785 MHz | 1805 MHz-1880 MHz | Small |
| 4 | IV | — | 1710 MHz-1755 MHz | 2110 MHz-2155 MHz | Large |

TABLE 1-continued

IM3 analysis for existing MSR bands, Paired bands in MSR comprising of E-UTRA, UTRA and GSM/EDGE. Digital Cellular Service is denoted DCS and Personal Communication service is denoted PCS.

| MSR and E-UTRA Band number | UTRA Band number | GSM/EDGE Band designation | Uplink (UL) BS receive UE transmit | Downlink (DL) BS transmit UE receive | Duplex gap size in relation to band size |
|---|---|---|---|---|---|
| 5 | V | GSM 850 | 824 MHz-849 MHz | 869 MHz-894 MHz | Small |
| 6[(1)] | VI | — | 830 MHz-840 MHz | 875 MHz-885 MHz | Large |
| 7 | VII | — | 2500 MHz-2570 MHz | 2620 MHz-2690 MHz | Small |
| 8 | VIII | E-GSM | 880 MHz-915 MHz | 925 MHz-960 MHz | Small |
| 9 | IX | — | 1749.9 MHz-1784.9 MHz | 1844.9 MHz-1879.9 MHz | Large |
| 10 | X | — | 1710 MHz-1770 MHz | 2110 MHz-2170 MHz | Large |
| 11 | XI | — | 1427.9 MHz-1447.9 MHz | 1475.9 MHz-1495.9 MHz | Large |
| 12 | XII | — | 698 MHz-716 MHz | 728 MHz-746 MHz | Small |
| 13 | XIII | — | 777 MHz-787 MHz | 746 MHz-756 MHz | Large |
| 14 | XIV | — | 788 MHz-798 MHz | 758 MHz-768 MHz | Large |
| 15 | XV | — | Reserved | Reserved | |
| 16 | XVI | — | Reserved | Reserved | |
| 17 | — | — | 704 MHz-716 MHz | 734 MHz-746 MHz | Large |
| 18 | — | — | 815 MHz-830 MHz | 860 MHz-875 MHz | Large |
| 19 | XIX | — | 830 MHz-845 MHz | 875 MHz-890 MHz | Large |
| 20 | XX | — | 832 MHz-862 MHz | 791 MHz-821 MHz | Small |
| 21 | XXI | — | 1447.9 MHz-1462.9 MHz | 1495.9 MHz-1510.9 MHz | Large |

NOTE 1:
The band is for UTRA only
NOTE 2:
The band is for E-UTRA only.

TABLE 2

Maximum RFBW to avoid IM3 for concerned bands

| MSR Band number | UTRA Band number | GSM/EDGE Band designation | Uplink (UL) BS receive UE transmit | Downlink (DL) BS transmit UE receive | Maximum RFBW without IM3 |
|---|---|---|---|---|---|
| 2 | II | PCS 1900 | 1850 MHz-1910 MHz | 1930 MHz-1990 MHz | 40 MHz |
| 3 | III | DCS 1800 | 1710 MHz-1785 MHz | 1805 MHz-1880 MHz | 47.5 MHz |
| 5 | V | GSM 850 | 824 MHz-849 MHz | 869 MHz-894 MHz | 22.5 MHz |
| 7 | VII | — | 2500 MHz-2570 MHz | 2620 MHz-2690 MHz | 60 MHz |
| 8 | VIII | E-GSM | 880 MHz-915 MHz | 925 MHz-960 MHz | 22.5 MHz |
| 12 | XII | — | 698 MHz-716 MHz | 728 MHz-746 MHz | 15 MHz |
| 20 | XX | — | 832 MHz-862 MHz | 791 MHz-821 MHz | 20.5 MHz |

In prior art the admission control or handover decision between network nodes is based on various factors or performance measured such as cell signal strength and/or quality, cell load, user quality of service (QoS) requirement, etc. The radio related challenges of selecting an appropriate carrier belonging to a network node e.g. an MSR base station, and in particular to the NC-MSR base station, have shown that a reduced performance of the communication may be experienced when making a decision based on these various factors.

SUMMARY

An object of embodiments herein is to provide a cellular radio system with a reliable performance.

According to an aspect the object, according to some embodiments herein, may be achieved by a method in a second network node for enabling radio resource management in a cellular radio system. The second network node signals an indicator to a first network node in the cellular radio system. The indicator indicates an impact of an intermodulation (IM) caused by a transmission from a transmitter in the second network node on a receiver in the second network node.

According to another aspect the object, according to some embodiments herein, may be achieved by a method in the first network node for performing radio resource management in the cellular radio system. The first network node receives the indicator, from the second network node in the cellular radio system. The indicator, as stated above, indicates an impact of an intermodulation caused by a transmission from a transmitter in the second network node on a receiver in the second network node. The first network node uses the received indicator for a radio resource management purpose.

According to a further aspect the object, according to some embodiments herein, may be achieved by a method in a second network node for radio resource management in the cellular radio system. The second network node derives an indication of an impact of an intermodulation caused by a transmission from a transmitter in the second network node on a receiver in the second network node. The second network node uses the derived indication for performing radio resource management in the second network node.

According to yet another aspect the object, according to some embodiments herein, may be achieved by a second network node for enabling radio resource management in a cellular radio system. The second network node comprises a transmitter and a receiver. The second network node further comprises a transmitting circuit configured to signal the indicator to a first network node in the cellular radio system. The indicator indicates an impact of an intermodulation caused by a transmission from the transmitter in the second network node on the receiver in the second network node.

According to still another aspect the object may be achieved by a first network node for performing radio resource management in the cellular radio system. The first network node comprises a receiving circuit configured to receive the indicator, from the second network node in the cellular radio system. The indicator indicates an impact of an intermodulation caused by a transmission from the transmitter in the second network node on the receiver in the second network node. The first network node further comprises a using circuit configured to use the received indicator for a radio resource management purpose.

According to an aspect the object may be achieved by a second network node adapted for radio resource management in the cellular radio system. The second network node comprises a receiver configured to receive a signal from the cellular radio system, and a transmitter configured to transmit a signal in the cellular radio system. Furthermore, the second network node comprises a deriving circuit configured to derive an indication of an impact of an intermodulation caused by a transmission from the transmitter in the second network node on the receiver in the second network node. The second network node further comprises a using circuit configured to use the derived indication for performing radio resource management in the second network node.

When incorporating user equipments to be served by a network node e.g. a multi-standard radio (MSR) base station without taking into account the emission characteristics, i.e. the IM, of the multi-standard radio (MSR) base station, the receiver performance of the MSR BS may be adversely affected. Embodiments herein take the IM into account, or enable the IM to be taken into account, when performing radio resource management resulting in a cellular radio system with a reliable performance.

BRIEF DESCRIPTION OF THE DRAWINGS

The foregoing and other objects, features, and advantages of embodiments herein will be apparent from the following more particular description of embodiments as illustrated in the accompanying drawings in which reference characters refer to the same parts throughout the various views. The drawings are not necessarily to scale, emphasis instead being placed upon illustrating the principles of the embodiments.

DETAILED DESCRIPTION

Figure 1:
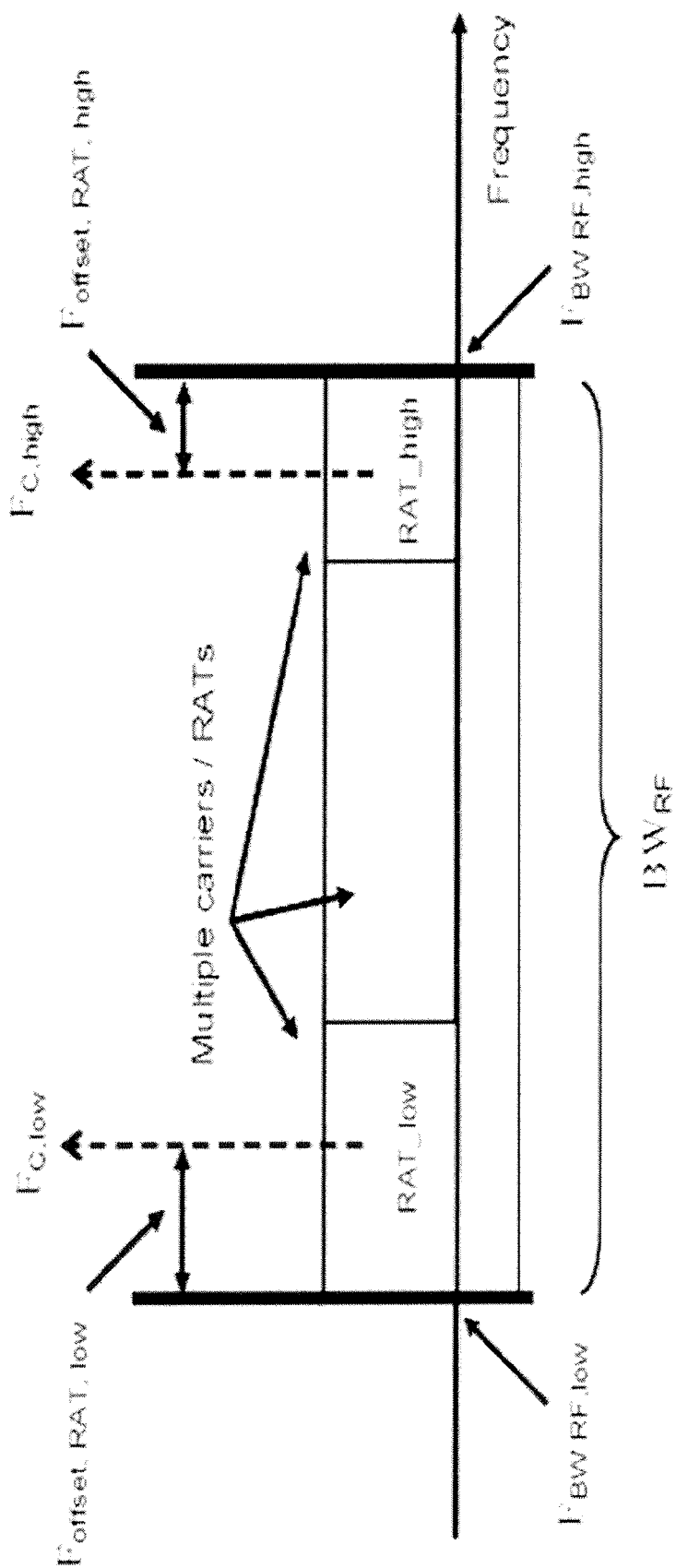
FIG. 1 is a diagrammatic view showing an example radio frequency (RF) bandwidth of contiguous MSR comprising of one or more RATs.
Figure 2:
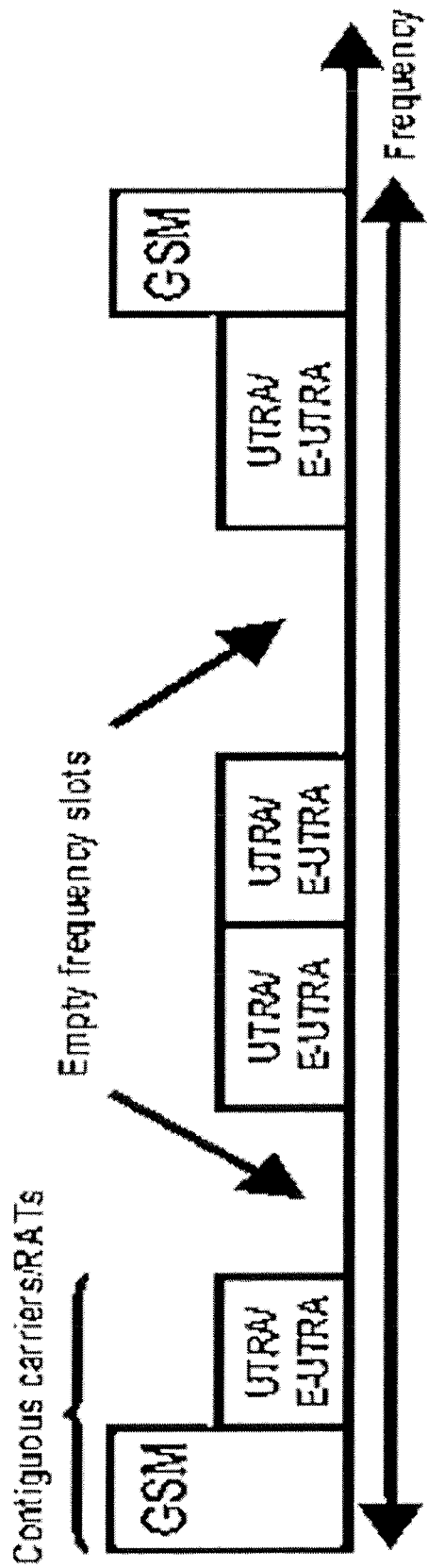
FIG. 2 is a diagrammatic view showing an example frequency block of non-contiguous MSR comprising of one or more RATs.
Figure 3:
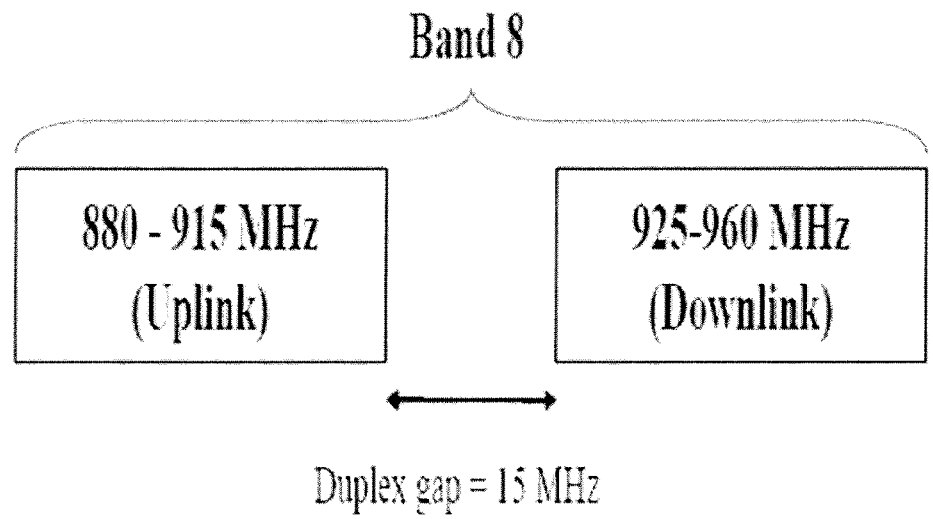
FIG. 3 is a diagrammatic view showing an example frequency band with a small duplex gap.
Figure 4:
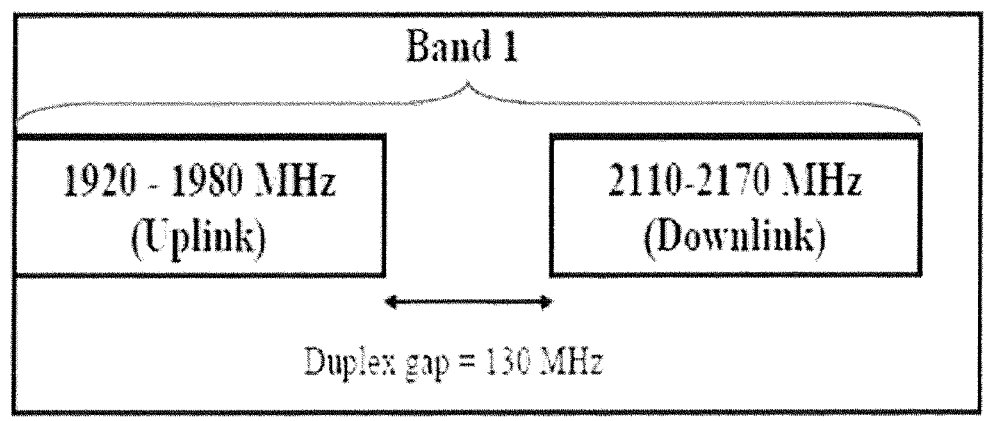
FIG. 4 is a diagrammatic view showing an example frequency band with relatively larger duplex gap.
Figure 5:
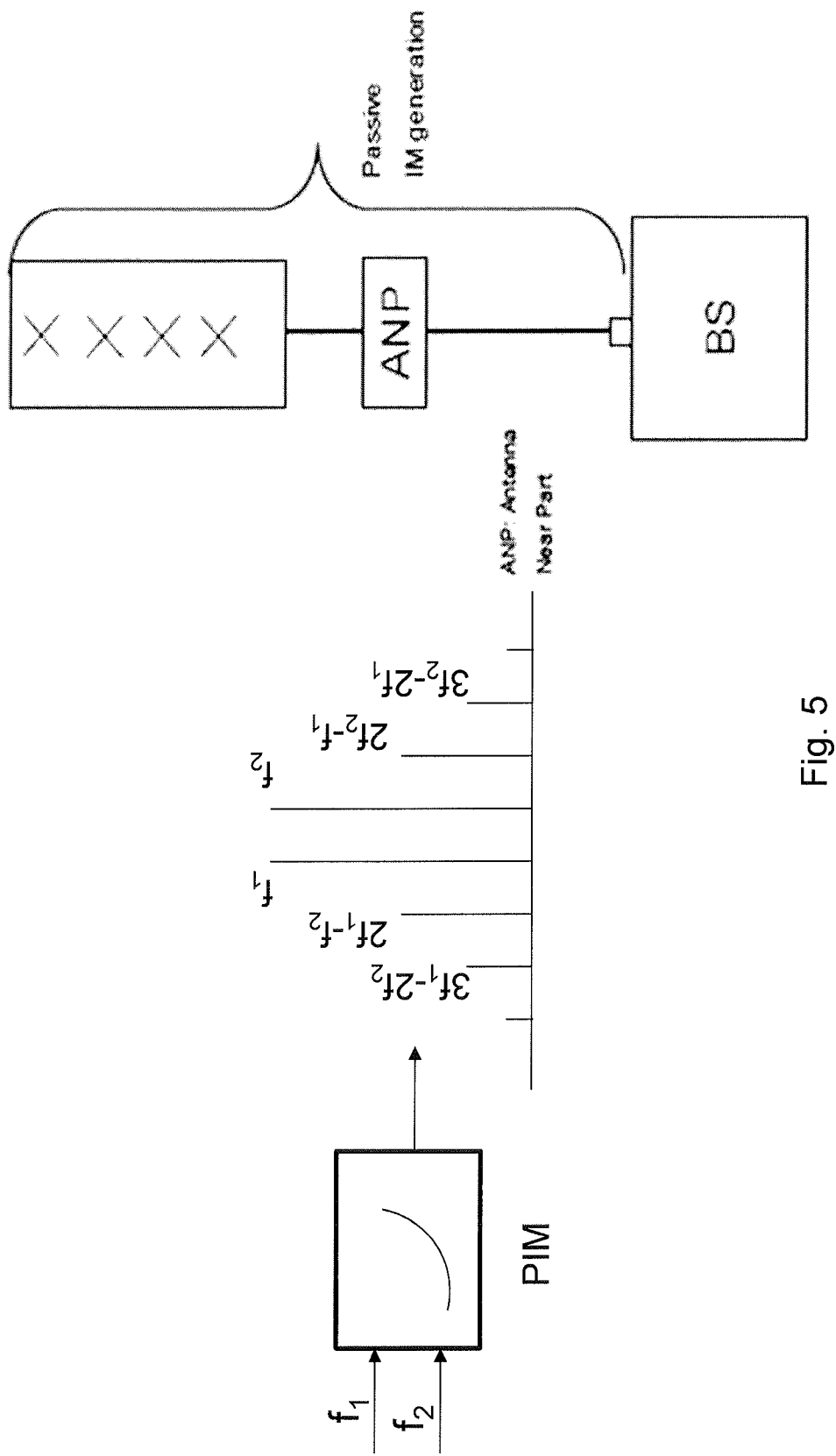
FIG. 5 is a diagrammatic view showing an example PIM and PIM generation path.
Figure 6:
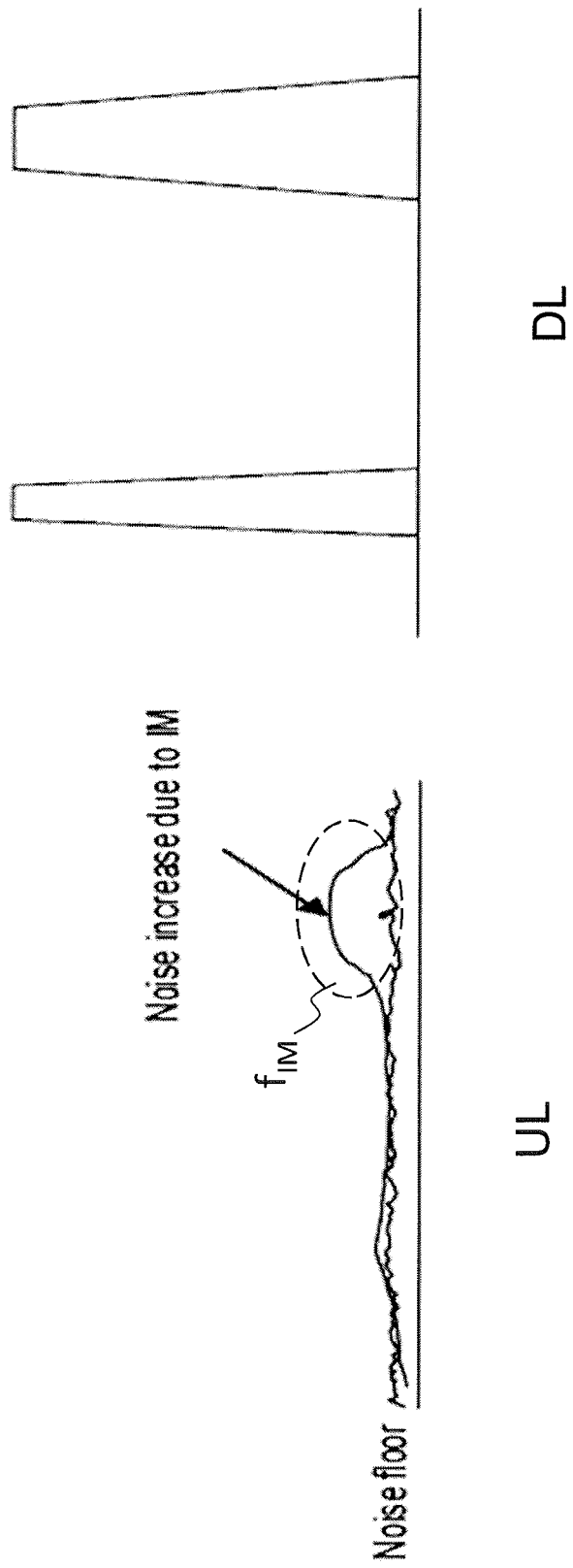
FIG. 6 is a diagrammatic showing a basic principle for broad bandwidth Inter-modulation (IM) products for combination of narrow/wide bandwidth transmitted signal.
Figure 7:
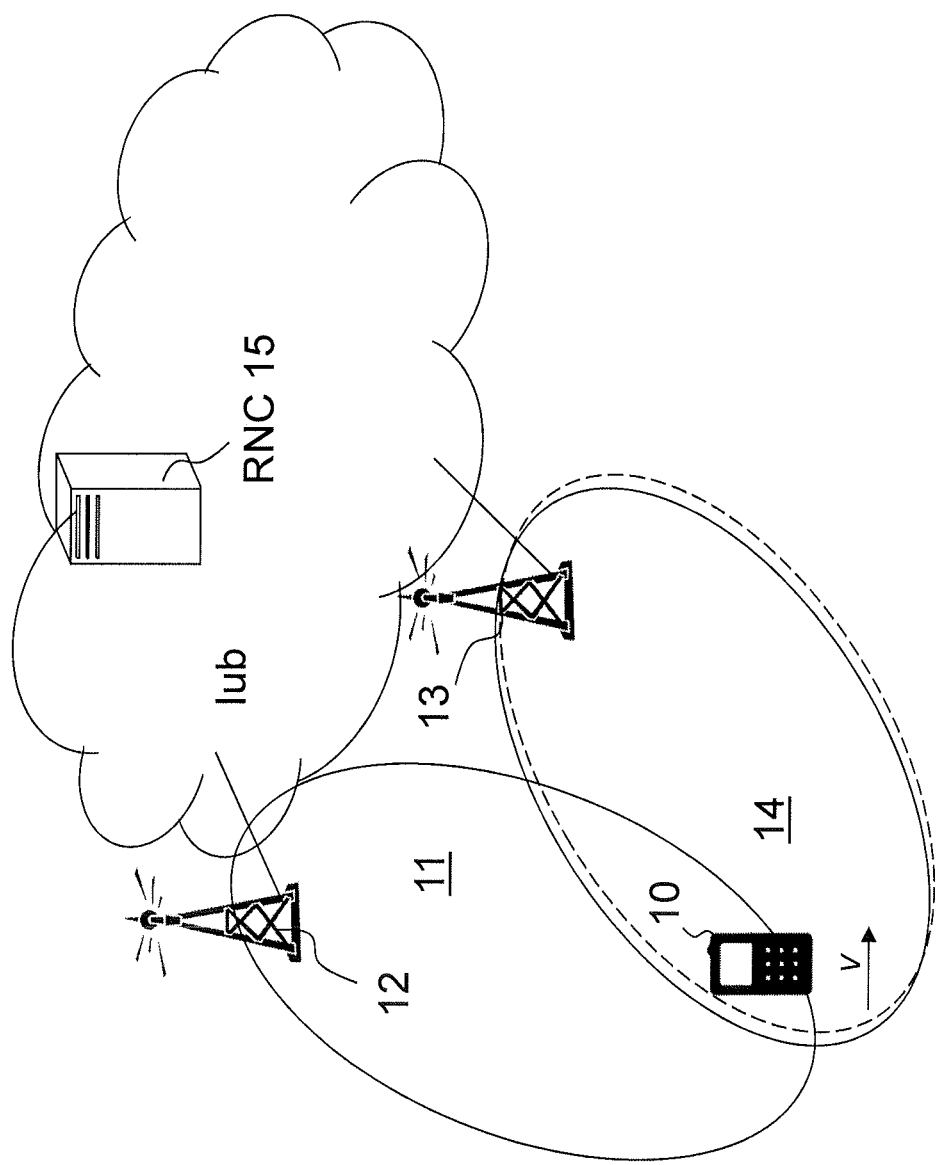
FIG. 7 is a schematic overview depicting a radio communications network according to embodiments herein.

FIG. 7 is a schematic overview depicting a cellular radio network according to some embodiments herein. In today's cellular radio networks a number of different technologies are used, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations to serve a user equipment 10. The cellular radio network comprises a first radio base station 12 and a second radio base station 13, providing radio coverage over at least one respective geographical area forming a first cell 11 served by the first radio base station 12 and a second cell 14 served by the second radio base station 13. The cell definition may also incorporate frequency bands used for transmissions, which means that two different cells may cover the same geographical area but using different frequency bands. The user equipment (UE) 10 may be served in the cells by the respective radio base station and may communicate with respective radio base station 12,13. The user equipment 10 transmits data over an air or radio interface to the radio base stations 12,13, respectively, in uplink (UL) transmissions and the radio base stations 12, 13 transmit data over an air or radio interface to the user equipment 10 in downlink (DL) transmissions. In the illustrated example the first radio base station 12 and the second radio base station 13 are controlled by a radio controller network node (RNC) 15. The first radio base station 12 and the second radio base station 13 may in GSM/EDGE be controlled by base station controller.

Some embodiments herein relate to signalling between a first network node and a second network node. The second network node is assigned with plural frequency carriers, and that allows for the second network node to provide plural cells that have overlap in radio coverage. It should be understood that also the first network node may be assigned with a plurality of carrier caring a same area. The first network node may be the first radio base station 12 or the radio network controller 15 depending on which of these nodes is taking a decision regarding allocation of radio resources within the first cell 11. The second network node may be the second radio base station 13, which is assigned with a number of frequency carriers as indicated by the dashed cell lines. The second network node signals an indicator to the first network node in the cellular radio system over an Iub interface or similar between the second network node and the first network node. The indicator indicates an impact of an inter-modulation caused by a transmission from a transmitter in the second network node on a receiver in the second network node. For example, the user equipment 10 may move towards the second radio base station 13. The second radio base station 13 has informed the RNC 15 of the IM of a carrier or band served by the second radio base station 13. The receiving RNC 15 then acts for a radio resource management purpose using the received indicator, e.g. to avoid generating IM at the second radio base station 13, such as assigning a lower transmission power to frequency bands generating IM or a IM over a threshold, not admitting the user equipment 10 to these carriers or band, or similar. In some embodiments the RNC 15 may evaluate the frequencies or carriers to be used in second radio base station 13 when the user equipment 10 is to be handed over to the second radio base station 13.

The Inter-modulation (IM) products or more specifically passive IM products arise due to relative power difference between carriers and in particular between non-contiguous carriers. The problem is accentuated when carriers are non-contiguous.

It should be understood that the first network node may be any configuring or controlling node which has means to control or manage e.g. a multi-standard radio (MSR) node or receives an MSR IM indicator of other MSR nodes or capable of requesting MSR nodes to report their MSR IM indicator, e.g., an RNC, an BSC, a Self-Organizing network node (SON), an Operations Support System node (OSS), an Operation and Maintenance node (O&M), a positioning node, a network planning and configuring node, a donor Base Station, a core network node or the MSR node itself, etc.

The second network node may further be a multi-standard radio (MSR) node, e.g., an MSR BS, an MSR relay, a donor MSR BS, etc.

Embodiments herein are applicable where the carriers of an MSR node comprises of narrow bandwidths, are non-contiguous and belong to certain frequency band with smaller duplex gap. For example the legacy MSR base station with wide bandwidth carriers may easily support bandwidth of 25 MHz for MSR/UTRA/E-UTRA FDD bands 5, 8 and 20. These bands, e.g. 5, 8 and 20, are 25 MHz, 25 MHz and 30 MHz wide respectively. But in the NC-MSR the bandwidth for these bands will be below 25 MHz, see Table 2 above. Therefore radio resources may be assigned such that the bandwidth is utilized efficiently. The technology disclosed herein applies to all types of MSR base station classes mentioned above. Furthermore, the technology disclosed herein applies to all different types of base station which e.g. comprise non-contiguous carriers or non-contiguous sub-blocks of frequency.

Figure 8:
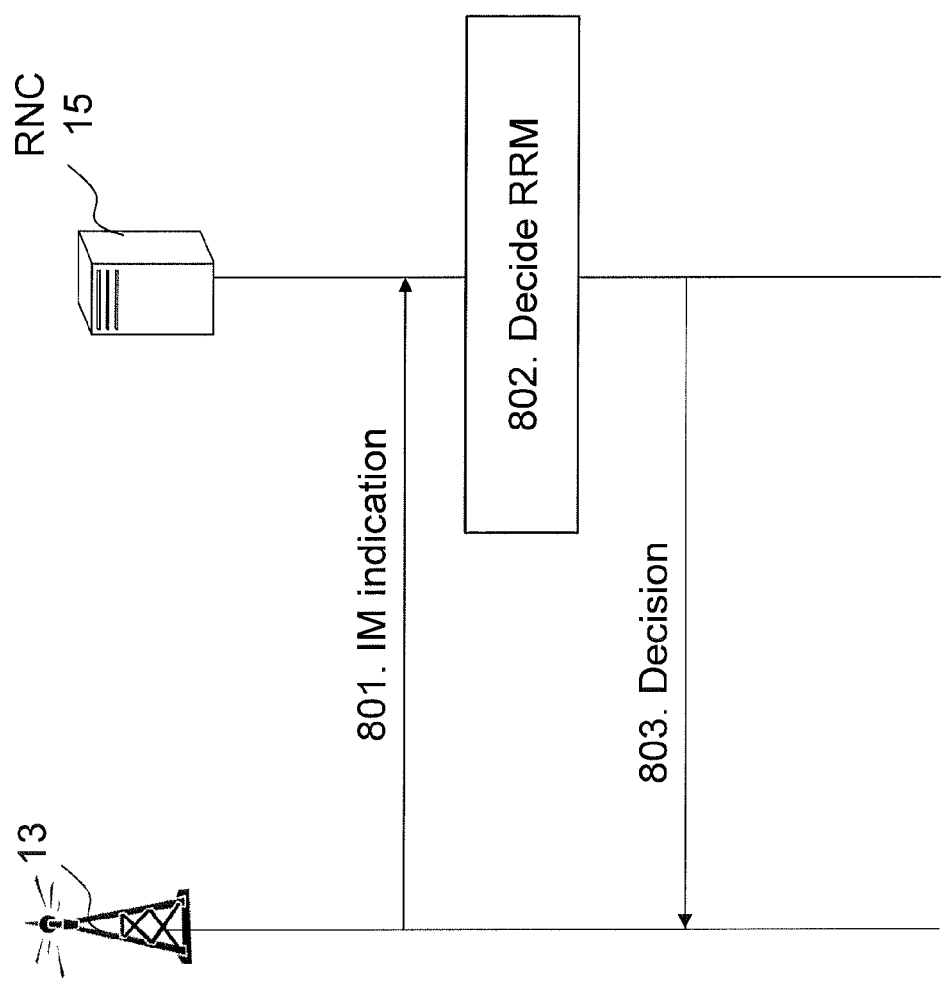
FIG. 8 is a combined flowchart and signalling scheme in a radio communications network according to embodiments herein.

FIG. 8 is a combined flowchart and signalling scheme according to embodiments herein. The first network node is in this example the RNC 15 and the second network node is exemplified as the second radio base station 13.

Action 801.

The second radio base station 13 signals the indicator, e.g. IM indication, to the RNC 15.

Action 802.

The RNC 15 may then, based on the received indication, decide to schedule the user equipment 10 to a certain carrier or band having an IM below a threshold or none signaled IM. It should here be noted that the RNC 15 may perform other radio resource management procedures such as admittance of the user equipment 10 to the second radio base station 13, handover decisions to the second radio base station 13 or similar, taking at least the IM indication into account. Thus, the RNC 15 is enabled to manage radio resources in order to avoid or reduce generated IM.

Action 803.

The RNC 15 may then inform a radio resource management decision, e.g. a scheduling decision, to the second radio base station 13 indicating e.g. the scheduled resource for the second radio base station 13, which in turn may schedule the user equipment 10 accordingly.

Figure 9:
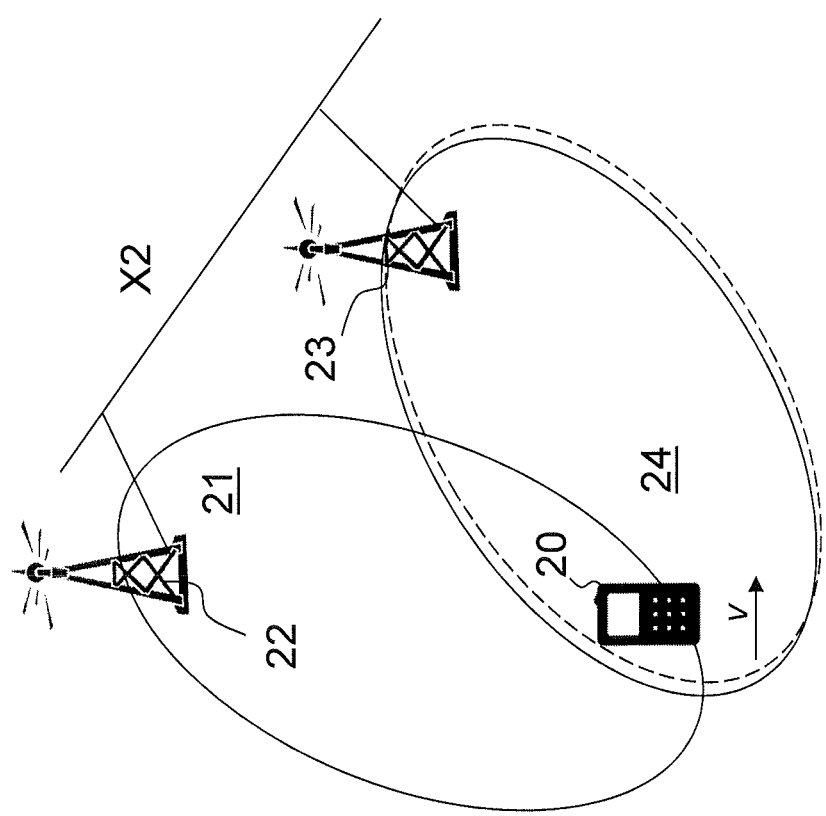
FIG. 9 is a schematic overview depicting a radio communications network according to embodiments herein.

FIG. 9 is a schematic overview depicting a cellular radio network with a flat architecture, such as an LTE network, according to some embodiments herein. In the illustrated example the first network node is exemplified as a first base station 22 and the second network node is illustrated as a second base station 23. The cellular radio network comprises the first base station 22 and a second base station 23, providing radio coverage over at least one respective geographical area forming a third cell 21 served by the first base station 22 and a fourth cell 24 served by the second base station 23. A second user equipment 20 may be served in any of the cells 21,24 by the respective radio base station 22,23 and may communicate with respective radio base station 22,23. In the illustrated example the second base station 23 signals the IM of different carriers or frequency bands to the first base station 22 over an X2 interface, S1 interface or similar between the second base station 23 and the first base station 22. The second base station is assigned with a plurality of bands or carriers covering a same area as indicated by the dashed line. The first base station 22 may determine, from signal measurements from the second UE 20, that a possible handover process of the second user equipment 20, to be served in the fourth cell 24, is to be performed. The first base station 22 serves the second user equipment 20 on a frequency band. However, the frequency band may be indicated to have IM or an IM above a threshold at the second base station 23, which IM have been signaled to the first base station 22. Then, the first base station 22 determines that the fourth cell 24 is served by the second base station 23. Furthermore, a Handover (HO) request is sent to the second base station 23 of a frequency band that is different than the frequency band with the reported IM. The second base station 23 then accepts or rejects the HO request based on e.g. whether radio resources are available at the second base station 23. The second base station 23 may then send information indicating the radio resources to be used by the second user equipment 20 when accessing the second radio base station 23. The first base station 22 may then send a HO command to the second user equipment 20 indicating at least the frequency band, carrier frequency, identifier of the second radio base station 23 and may also forward the received information regarding the radio resources from the second radio base station 23.

Figure 10:
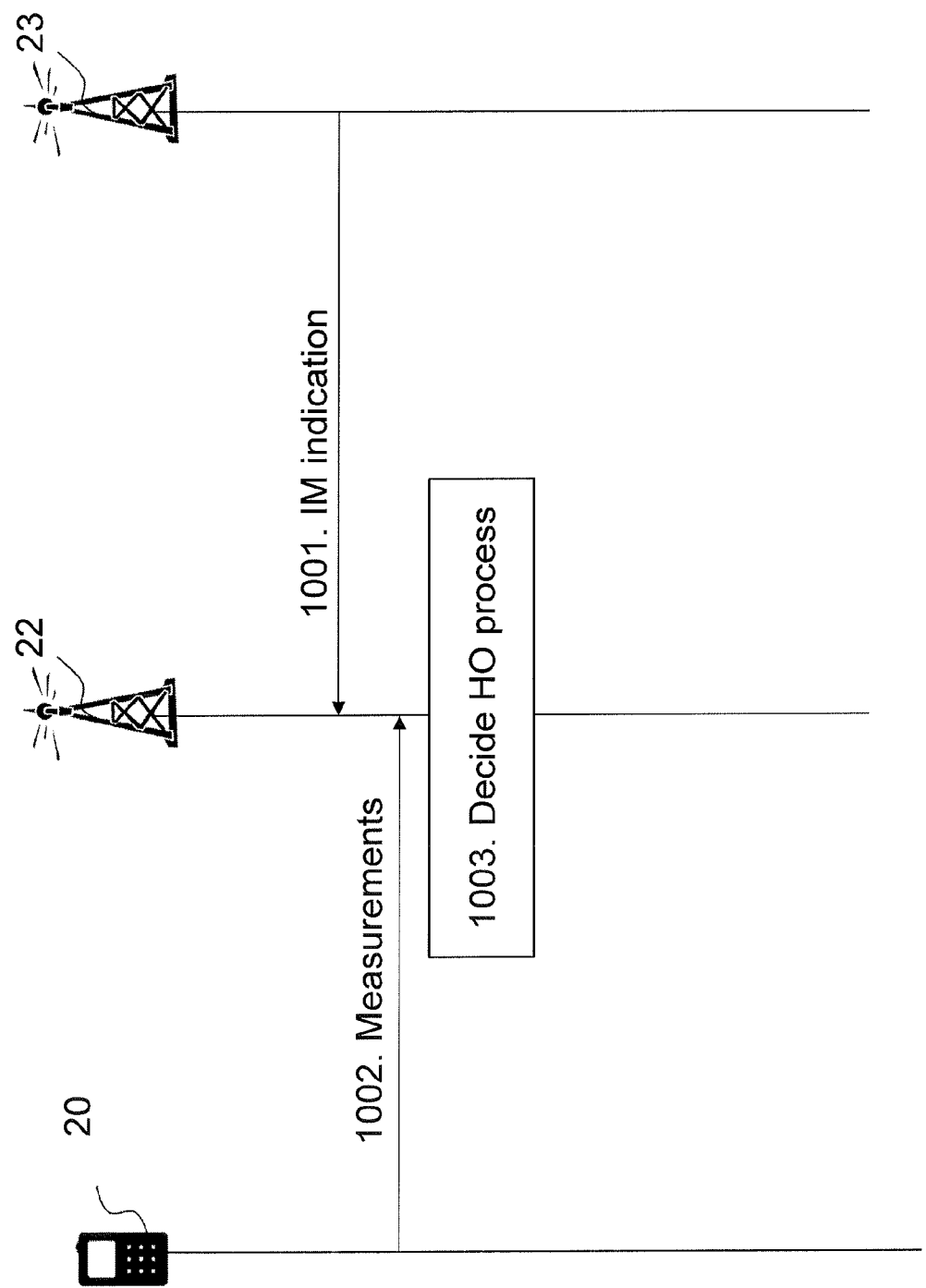
FIG. 10 is a combined flowchart and signalling scheme in a radio communications network according to embodiments herein.

FIG. 10 is a combined flow chart and signalling scheme in a cellular radio network according to embodiments herein. The first network node is exemplified as the first base station 22 and the second network node is exemplified as the second base station 23.

Action 1001.

The second base station 23 signals or transmits the IM indication, e.g. 1 bit PIM indicator carrier specific, to the firs base station 22, e.g. over the X2 interface between the second base station 23 and the first base station 22.

Action 1002.

The second user equipment 20 reports signal measurements of received signals to the first base station 22.

Action 1003.

The first base station 22 determines based on signal measurement(s), e.g. signal strength, signal quality or similar, of the second base station 23 as measured at the second user equipment 20, that a handover should be performed of the second user equipment 20 to the second base station 23. The first base station 22 may then, based on the received indication of IM, avoid handover to frequencies generating IM at the second base station 23 or to frequencies that are exposed to IM. Thus, the first base station 22 may determine handover process based on the received indication.

This type of RRM action may be performed in the first network node in both flat and hierarchical RAN architectures. In both RAN architectures the first network node which performs handover takes into account at least the IM indicator or relevant information of the second node. In flat architecture such as in LTE the serving or source BS of the UE 20, i.e. serving a UE such as the first base station 22, uses e.g. the PIM characteristics of a plurality of, neighboring, second base stations when performing the handover to a target BS of the UE 20, i.e. one of the second nodes. In hierarchical architecture such as in UMTS the serving or source node of the UE 10, i.e. serving RNC, such as the RNC 15 in FIG. 7, uses e.g. the PIM characteristics of one or more BSs when performing the handover to the target BS of the UE 10, i.e. one of the second base stations.

In both architectures for performing handover the first network node may select the second network node which has lower impact of PIM on its receiver performance. For example, the first base station 22 may select one second base station out of a plurality of second base stations 23 which has indicated a PIM value that is lowest of the plurality of second base station 23, i.e. least degradation of own receiver performance due to the PIM. The first base station 22 may also use additional information such as signal strength or signal quality of UE, required base station transmit power or similar measures when selecting the second base station for performing handover.

Figure 11:
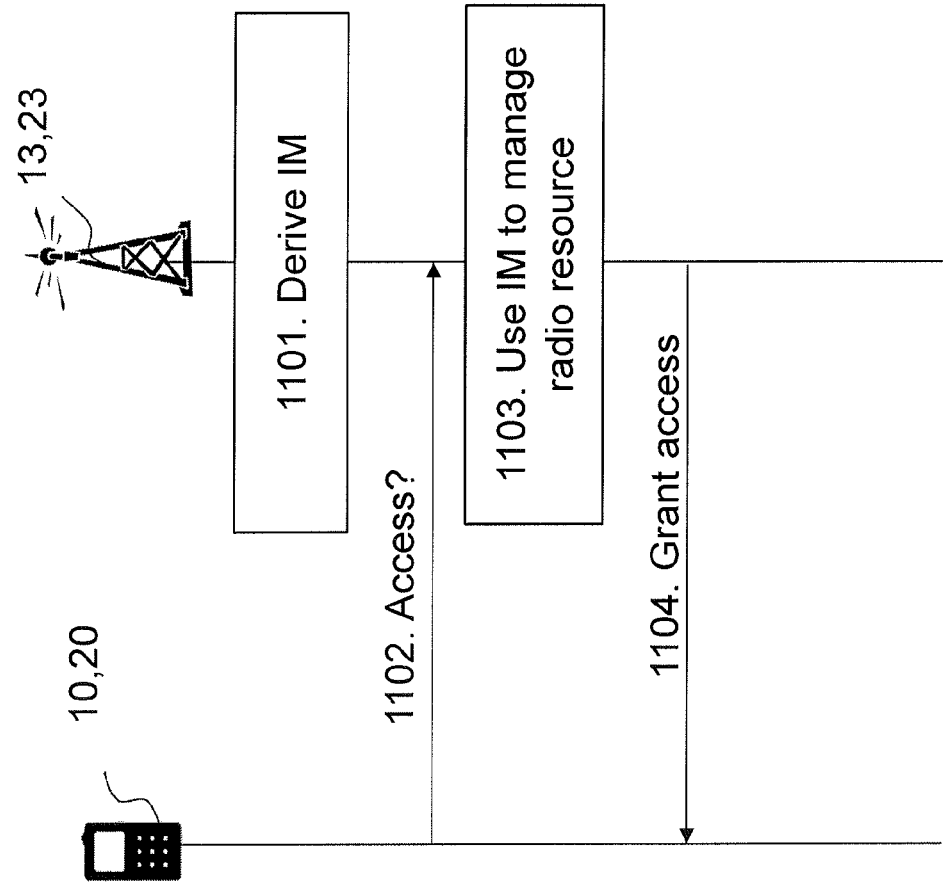
FIG. 11 is a combined flowchart and signalling scheme in a radio communications network according to embodiments herein.

FIG. 11 is a schematic combined flow chart and signalling scheme in a cellular radio network. The second network node may be the second radio base station 13 or the second base station 23.

Action 1101.

The second network node derives an IM of frequency band(s) or carrier(s) served by the second network node. Thus, the second network node derives the IM locally at the second network node. This may be manually configured or updated by an operator or similar.

Action 1102.

The user equipment 10,20 requests access to the second network node.

Action 1103.

The second network node may in these embodiments manage radio resources taking the IM of different frequency bands or carriers derived in action 1101 into account. For example, the second network node may avoid generating IM over certain frequency bands or carriers either by avoiding scheduling user equipment to these radio resources or by limit transmission power over frequency bands or carriers that have IM or IM over a certain threshold.

Action 1104.

For example, the second network node may grant a user equipment to use radio resources of a frequency band or carrier not generating IM.

Thus, some concepts of the technology disclosed herein comprise several embodiments. According to some embodiments disclosed herein a method in the second network node or the source node, e.g. the second radio base station 13 or second base station 23, comprises the steps or acts of signalling to the target node the indicator or relevant information indicating the impact of a MSR transmitter Inter-modulation (IM), e.g. in particular the impact of the passive IM3, on a MSR receiver performance. The target receiving node, that is the first network node, uses the received indicator for e.g. RRM purposes, such as carrier selection, network planning, or similar. RRM also comprises e.g. managing UE radio resource such as UL power control by the second network node. Source and Target herein relates to the source and target of the IM indication. According to some embodiments disclosed herein a method in the first network node, e.g. when the first network node is the radio network controller 15, comprises the steps or acts of selectively admitting new or existing user equipments on appropriate carriers belonging to the second network node, such as an MSR node, e.g., MSR BS. The appropriate carriers are determined by taking into account MSR characteristics, e.g. at least two MSR characteristics. One of the MSR characteristics is radio emission characteristics of the selected MSR carrier wherein the said MSR characteristic comprises of at least one of:

Transmitter inter-modulation impact on the receiver performance or an indicator depicting it, and An operating frequency band characteristic of the selected MSR carrier wherein the said operating frequency band characteristic comprises of the duplex gap, and Optionally one or more state of art characteristics such as signal quality, signal strength, cell load, traffic load, user QoS, bit rate or SNR requirements, BS transmit power required to serve the user equipments, and/or similar.

According to an example aspect of the technology disclosed herein, when the transmitter inter-modulation levels exceed a threshold and the duplex gap of the frequency band is below threshold, a method in the first network node being the RNC 15 further comprises the acts or steps of:

Selecting the narrow bandwidth MSR carrier, e.g., GSM carrier(s), for admitting users to the MSR BS wherein the selected MSR narrow bandwidth carrier is located closer to the wide bandwidth carrier in the frequency domain or Selecting narrow bandwidth carriers closer to each other, in each direction, in case only narrow bandwidth carriers are allocated. For example allocating 2 GSM carriers, 200 KHz each, closer to each other in the UL; since UL-DL frequency separation is typically fixed for most of the frequency bands so the corresponding 2 DL carriers will also be closer to each other.

According to an example aspect of the technology disclosed herein, when the transmitter inter-modulation levels exceed a threshold and the duplex gap of the frequency band is below threshold, the method in the first network node further comprises the act or step of selecting two or more GSM carriers in the MSR base station for performing frequency hopping on selected GSM carriers wherein the selected GSM carriers are located closer to the wide bandwidth carrier in the frequency domain.

According to an example aspect of the technology disclosed herein, when the impact of transmitter inter-modulation (IM) on the receiver performance is severe and the duplex gap is below threshold, the method in the first network node being the RNC 15 comprises the acts or steps of:

Deactivating one or more MSR carrier of the second network node, and may

Reactivating the previously deactivated MSR carrier when the impact of the passive transmitter inter-modulation on the receiver degradation is low or negligible.

According to an example aspect of the technology disclosed herein when the output power is below a certain threshold, the method in the first network node comprises the acts or steps of allocating two or more carriers and in particular narrow bandwidth carriers, e.g., GSM carriers, up to the maximum transmission bandwidth of the second network node, such as a MSR BS.

Figure 12:
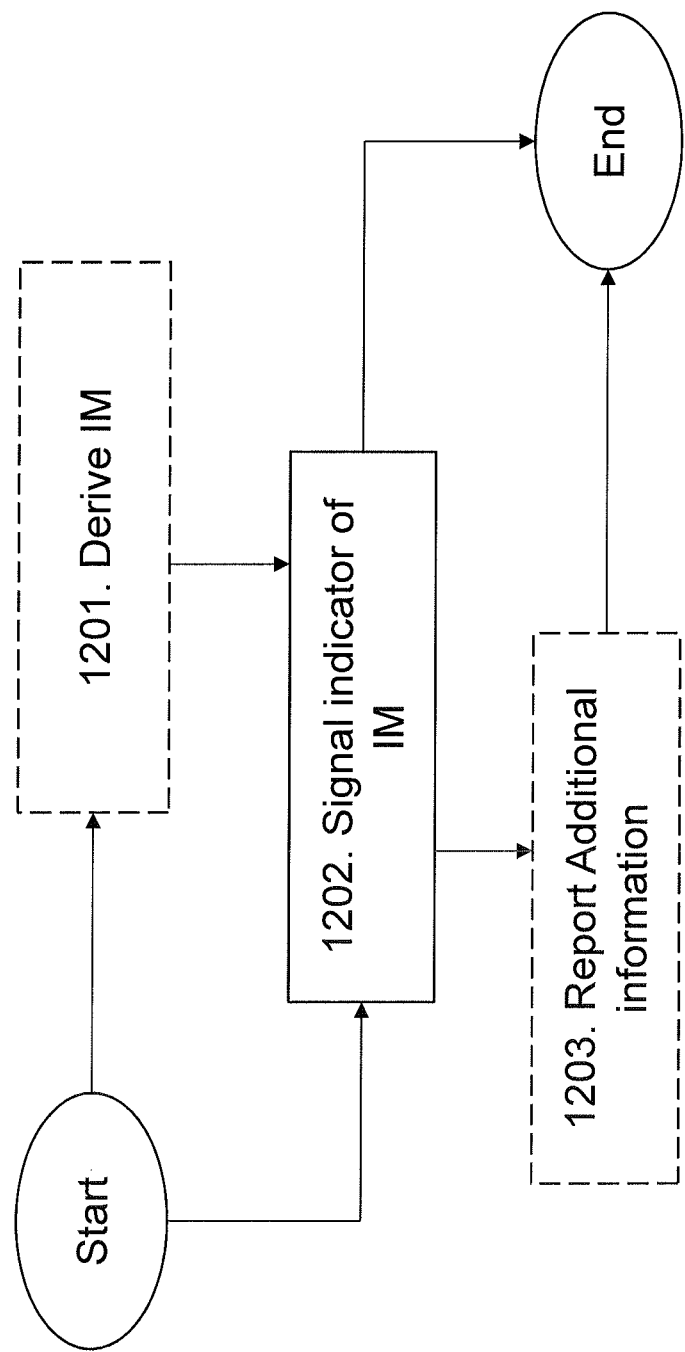
FIG. 12 is a schematic flow chart depicting a method in a second network node according to some embodiments herein.

The action steps in the second network node, exemplified above as the second radio base station 13 or the second base station 23, for enabling radio resource management in the cellular radio system according to some general embodiments will now be described with reference to a flowchart depicted in FIG. 12. The actions do not have to be taken in the order stated below, but may be taken in any suitable order. Actions only performed in some embodiments are marked with a dashed box.

Action 1201.

The second network node may derive the indicator based on statistical measurements or information obtained over time.

The indicator may be derived based on some statistical measurement or information obtained over certain time. The indicator can be obtained or determined by measuring it over certain period of time (T0). The time T0 can be pre-determined value or configurable by the target node or by any other network node.

The indicator may depend also on MSR configuration, e.g., spectrum block sizes, size of gap in case of NC-MSR etc.

Action 1202.

The second network node signals the indicator to the first network node in the cellular radio system. The indicator indicates an impact of an intermodulation caused by a transmission from a transmitter in the second network node on a receiver in the second network node.

The indicator may comprise a 1 bit indicator, IM or not IM, or a real value. The indicator may be related to frequency band, technology, or may be carrier specific.

According to an example aspect of the technology disclosed herein a method in the second network node or the source node comprises the steps or acts of signalling to the target node an indicator or relevant information indicating the impact of the MSR transmitter Inter-modulation (IM), and in particular the impact of the passive IM3, on the MSR receiver performance. The target receiving node uses the received indicator for RRM purposes, e.g., carrier selection, network planning, etc.

Methods and apparatus for signalling for exchanging MSR emission radio characteristics between network nodes. The signalled information may comprise an indicator or relevant information which indicates or depicts the impact of the MSR transmitter IM, and in particular the impact of the passive IM3, on the MSR receiver performance. The indicator may indicate whether the MSR receiver performance is degraded or not.

According to some embodiments certain MSR radio emission characteristics of MSR node, e.g., MSR BS, are exchanged between the network nodes.

The example of radio emission characteristics to be signaled or exchanged is an indicator or any relevant information which indicates or depicts the impact of the MSR transmitter IM, and in particular the impact of the passive IM3, on the MSR receiver performance. The indicator which may be termed as IM indicator, or PIM3 indicator in particular, may indicate whether the MSR receiver performance is degraded or not.

In some embodiments the indication is a multi-level indicator or a real value indicator. The indicator may comprise of two levels or it may also be multi-level. For example 2-level indicator indicates whether the impact of the MSR transmitter IM3 will degrade the MSR receiver performance or not. A multi-level indicator may indicate different level of receiver degradation, e.g., 4-level indicator may indicate 4 different level of degradation: low, medium, high and severe, etc.

In some embodiments the signalling is performed upon request from the first network node, such as the RNC 15 or similar, or proactively. The IM indicator may be exchanged between the network nodes more frequently or when the IM indicator is changed, i.e. event triggered reporting, as will be described below. The IM indicator values are exchanged or sent to other nodes less frequently as also described below.

The IM indicator values of MSR node may be signaled to other nodes of the same type as the first network node in order to facilitate the RRM decisions such as MSR carrier selection, admission control, selection of carriers for frequency hopping, or similar. For example when assigning the MSR carrier to the new or existing UE, the serving node, e.g., RNC or MSR BS, may take into account the IM indicator in the serving MSR node and in the strongest or closest neighboring MSR node. In this way the MSR carrier will not be changed after the UE performs handover to the neighboring MSR node. This is further elaborated herein.

There are different types of reporting mechanisms for reporting the IM indicator from the second network node, i.e. source of the IM indication MSR node, to the first network node, i.e. target of the IM indication or receiving node.

The signalling protocol used for reporting the IM indicator depends upon the type of source and target device. In some cases the first and the second network nodes are similar. For example the source MSR BS directly signals the IM indicator to the target MSR BS over X2 interface in LTE. In case the second network node is MSR wireless terminal, the IM indicator may be reported to the first network node using Radio Resource Control (RRC) protocol or LTE Positioning Protocol (LPP) protocol. The former protocol, RRC, is used to report the IM indicator to the target radio node, e.g., RNC 15, first base station 22 or first radio base station 13. The latter protocol, LPP, may be used if the IM indicator is reported to the positioning node in LTE, i.e. Evolved-Serving Mobile Location Centre (E-SMLC) in LTE.

The different reporting mechanisms for reporting the IM indicator are described below:

Proactive Reporting

According to some embodiments the second network node, e.g. source MSR node, may report the information about its IM indicator to the first network node, e.g. a target node, proactively without any explicit request from the target node.

Furthermore the source MSR node (second network node) may report either the measured IM indicator or the typical IM indicator (e.g., max and/or min level) or both to the first network node.

The MSR node, e.g., MSR BS, may signal the information related to the IM indicator, measured IM and/or typical IM indicator, to the first network node proactively during any of the scenarios below:

When the MSR node is initially setup or introduced in the network.

When one or more parameters associated with the MSR node are changed, e.g., sub-blocks of frequency in NC-MSR node is increased or decreased.

When the MSR node is upgraded or downgraded, e.g., radio parts such as RF filters, power amplifiers etc are replaced or modified to increase the BW or frequency block size.

When the first network node notices that new network nodes, e.g., new second network node such as BS, relay, RNC or similar, are introduced or removed in the network. The first network node, i.e. MSR node, can notice this change in case it receives new or previously unknown cell identifier(s) from the other nodes.

When the cell identifier of any of the existing second network node or of the first network node, e.g., cell ID of MSR BS, is changed. The cell identifier of the MSR or any other node may be changed due to the network planning or when new nodes are added or the existing ones are removed.

Furthermore the second network node may also report the determined IM indicator to the first network node periodically and/or on event triggered basis, e.g., when impact of the transmitter IM on the receiver performance is expected to be large or above threshold. The reporting periodicity, measurement interval (T0) for determining the IM indicator, event triggered thresholds etc can be pre-determined or configured by the second network node i.e. source node itself.

Reporting Upon Receiving Request from Other Node

According to some embodiments typically any suitable first network node, e.g., the target node of the IM indication, may configure or request the MSR node to report the information related to its IM indicator, then being a requesting node.

The requesting node may also specify the second network node to report the IM indicator either periodically or on event triggered basis or using both reporting methods. The requesting node may also specify the associated reporting parameters such as periodicity of reporting, event triggered threshold, etc. Alternatively the second network node may use the default or pre-determined parameters for reporting the IM indicator to the target node, i.e. the first network node.

The requesting node may be the target node which also receives the MSR IM indicator information. For example another base station, which may or may not be MSR, may request the MSR BS to report the information related to the IM indicator. The request may be sent to the MSR node any time, e.g., during the initial setup of the MSR BS or at any other time or when any of the MSR configuration or associated parameter is changed.

In some cases the requesting node may even be a network node other than the network node which receives the information about the IM indicator of the second network node. For example the OSS node or SON node may request the MSR node to report its IM indicator to one or more neighboring BS or to the RNC. The requesting node may also provide the MSR node about the information, e.g., identifier, related to the target nodes which should receive the information about the IM indicator of the MSR node.

Action 1203.

The second network node may report additional information characterizing a configuration of the second radio network node to enable the first network node to interpret the signalled indicator. E.g. an MSR node may also report additional information characterizing the MSR configuration, e.g., MSR spectrum block size, gaps between spectrum blocks in frequency domain, number of spectrum blocks, types of RATs, number of RATs etc, to enable the first network node to interpret the received indicator. One of the MSR characteristics is radio emission characteristics of the selected MSR carrier wherein the said MSR characteristic comprises of at least one of:

Transmitter inter-modulation impact on the receiver performance or an indicator depicting it, and The operating frequency band characteristic of the selected MSR carrier wherein the said frequency band characteristic comprises of the duplex gap, and Optionally one or more state of art characteristics such as signal quality, signal strength, cell load, traffic load, user QoS, bit rate or SNR requirements, BS transmit power required to serve the users and/or similar.

In some embodiments the additional information may comprise spectrum block size, gap between spectrum blocks in frequency domain, number of spectrum blocks, types of radio access technologies, and/or number of radio access technologies.

The MSR node may also report additional information characterizing the MSR configuration, e.g., MSR spectrum block size, gaps between spectrum blocks in frequency domain, number of spectrum blocks, types of RATs, or number of RATs.

According to some embodiment the second network node comprises non-contiguous blocks of frequency spectrums or carriers. The problem may be accentuated when carriers are non-contiguous. The MSR may comprise of contiguous or non-contiguous block of spectrum or carriers. The MSR node may comprise of contiguous or non-contiguous block of spectrum or carriers. The embodiments of the technology disclosed herein are applicable to both contiguous and non-contiguous MSR an also to single carrier single RAT MSR. They are preferred embodiments for the non-contiguous MSR.

The intermodulation is passive intermodulation, which passive intermodulation is generated due to a non-linear characteristic of a passive radio frequency component used in the transmitter of the second network node. The Inter-modulation (IM) products or more specifically passive IM products arise due to relative power difference between carriers and in particular between non-contiguous carriers.

Figure 13:
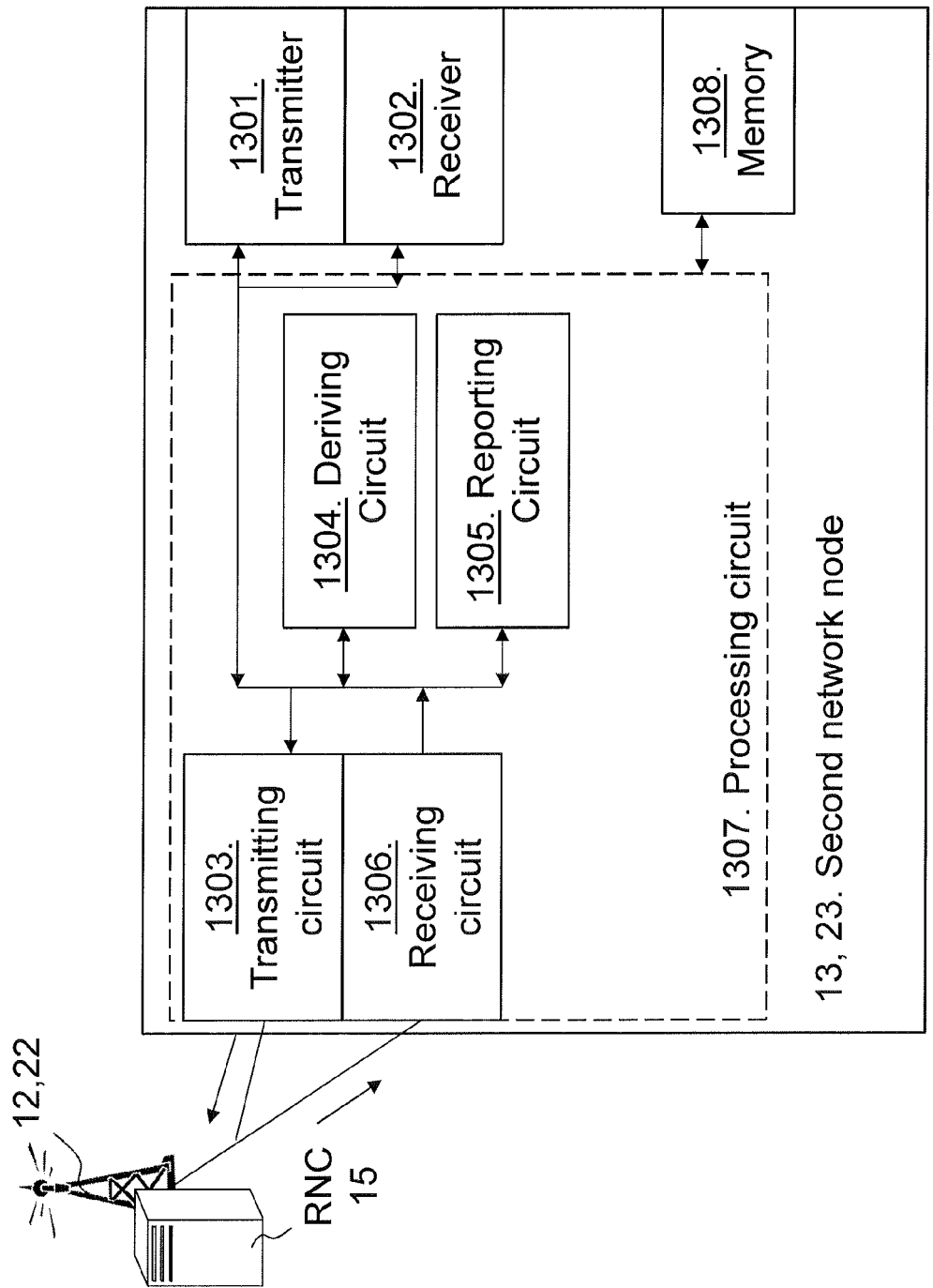
FIG. 13 is a block diagram depicting a second network node according to embodiments herein.

FIG. 13 is a block diagram depicting the second network node, such as the second radio base station 13 or the second base station 23, for enabling radio resource management in a cellular radio system.

The second network node comprises a transmitter 1301.

The second network node further comprises a receiver 1302.

The second network node furthermore comprises a transmitting circuit 1303 configured to signal an indicator to the first network node in the cellular radio system. The indicator indicates an impact of an intermodulation caused by a transmission from the transmitter in the second network node on the receiver in the second network node 13,23.

The second network node may further comprise a deriving circuit 1304 configured to derive the indicator based on statistical measurements or information obtained over time. The indication may be a multi-level indicator or a real value indicator.

The second network node may further comprise a reporting circuit 1305 configured to report additional information characterizing a configuration of the second radio network node to enable the first network node to interpret the signalled indicator. The additional information may comprises spectrum block size, gap between spectrum blocks in frequency domain, number of spectrum blocks, types of radio access technologies and/or number of radio access technologies.

The transmitting circuit 1303 may further be configured to perform the signalling upon request from the first network node or proactively. The second radio network node may further comprise a receiving circuit 1306 configured to be used to receive data from the first network node, such as information what carrier to use, transmit power to use or similar.

The second network node may in some embodiments comprise non-contiguous blocks of frequency spectrums or carriers.

In some embodiments the intermodulation is passive intermodulation, which passive intermodulation is generated due to a non-linear characteristic of a passive radio frequency component used in the transmitter 1301 of the second network node.

The embodiments herein enabling radio resource management in the cellular radio system may be implemented through one or more processors, such as a processing circuit 1307 in the second network node depicted in FIG. 13, together with computer program code for performing the functions and/or method steps of the embodiments herein. The program code mentioned above may also be provided as a computer program product, for instance in the form of a data carrier carrying computer program code for performing embodiments herein when being loaded into the second network node. One such carrier may be in the form of a CD ROM disc. It is however feasible with other data carriers such as a memory stick. The computer program code may furthermore be provided as pure program code on a server and downloaded to the second network node.

Those skilled in the art will also appreciate that the various "circuits" described may refer to a combination of analogue and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The second network node may further comprise a memory 1308 configured to be used to store data. The memory 1308 may comprise one or more memory units and may be used to store for example data such as indicators, radio resources, application to perform the methods herein when being executed on the second network node and/or similar.

Figure 14:
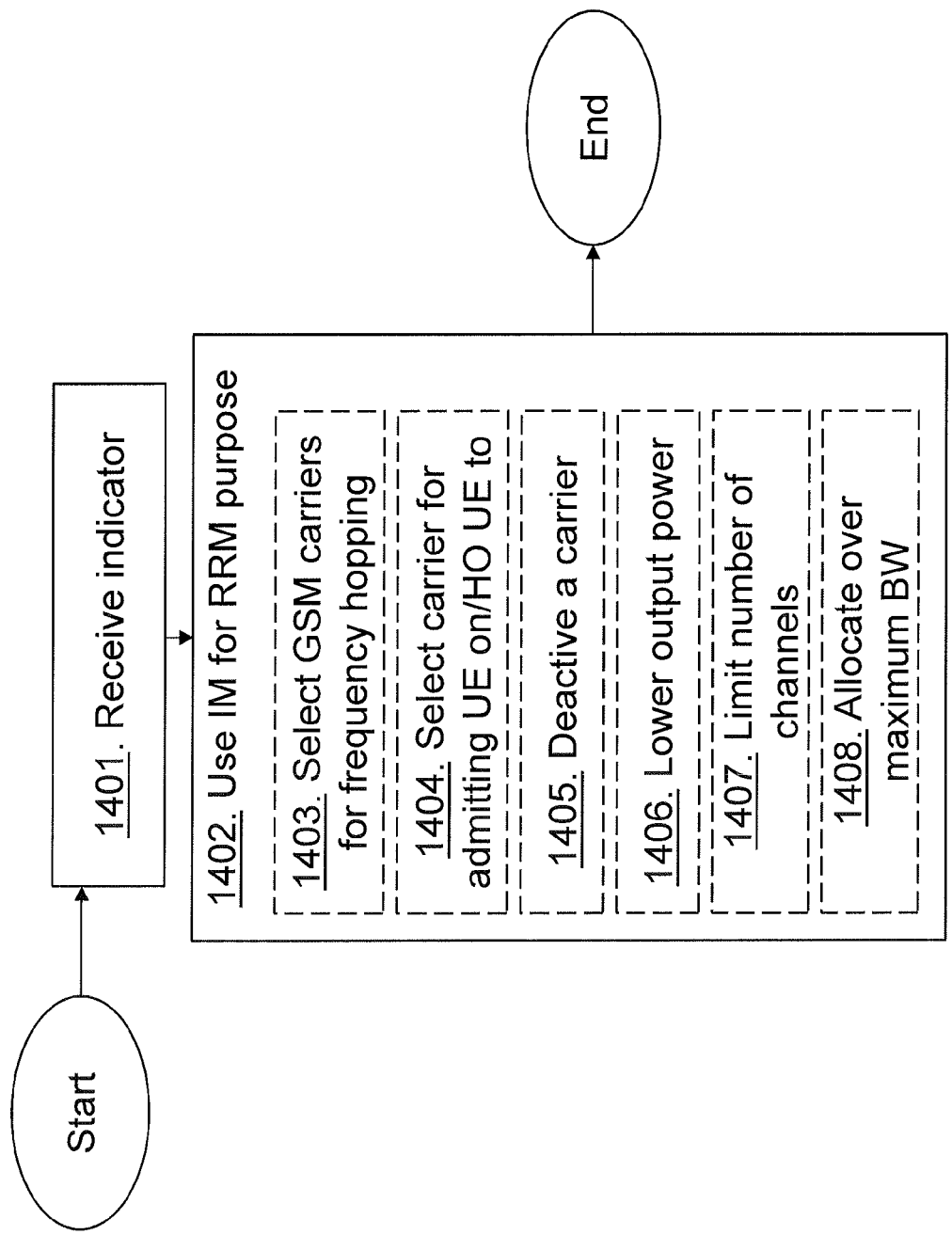
FIG. 14 is a schematic flow chart depicting a method in a first network node according to some embodiments herein.

The action steps in the first network node, exemplified above as the first radio base station 12, the RNC 15 or the first base station 22, for performing radio resource management in a cellular radio system according to some general embodiments will now be described with reference to a flowchart depicted in FIG. 14. The actions do not have to be taken in the order stated below, but may be taken in any suitable order. Actions only performed in some embodiments are marked with a dashed box.

Action 1401.

The first network node receives an indicator, from the second network node in the cellular radio system. The indicator indicates an impact of an intermodulation caused by a transmission from a transmitter in the second network node on a receiver in the second network node. The indicator may be a real value or a level value related to a frequency band or a carrier at the second network node.

Action 1402.

The first network node uses the received indicator for a radio resource management purpose.

E.g. the target receiving node, i.e. the first network node, may use the received indicator for RRM purposes, e.g., carrier selection, network planning, etc. In some embodiment the radio resource management purpose comprises at least one of: performing admission control for admitting or rejecting a user equipment 10 on a carrier belonging to the second network node based on the received indicator; performing a handover of a user equipment 10 to a carrier of the second network node taking the indicator into account; selecting a sequence of GSM carriers for frequency hopping; and/or network planning taking the received indicator into account. The first network node may in these embodiments be a controller node, such as the RNC 15, that controls the carriers of the second network node. When the first network node is a base station, such as the first radio base station 12, the radio resource management purpose may be to decide whether a handover should be performed or not, taking PIM indication into account as well as radio quality, service load or similar, or to select one of the frequencies at the second network node for the handover, by avoiding or prefer any of the frequencies available based on the PIM info.

According to an example aspect of the technology disclosed herein a method in the first network node comprises the steps or acts of selectively admitting new or existing users on the appropriate carriers belonging to the second network node, which is MSR node, e.g., MSR BS, wherein the appropriate carriers are determined by taking into account MSR characteristics, e.g. at least two MSR characteristics.

In some embodiment the first network node uses additional set of information for the radio resource management purpose. The additional set of information may comprise a duplex gap of frequency band. One of the MSR characteristics is radio emission characteristics of the selected MSR carrier wherein the said MSR characteristic comprises of at least one of:

Transmitter inter-modulation impact on the receiver performance or an indicator depicting it;

The operating frequency band characteristic of the selected MSR carrier wherein the said frequency band characteristic comprises of the duplex gap, and Optionally one or more state of art characteristics such as signal quality, signal strength, cell load, traffic load, user QoS, bit rate or SNR requirements, BS transmit power required to serve the users, and/or similar.

Action 1403.

In some embodiments the first network node further, when a level of intermodulation indicated by the indicator exceeds a threshold and/or the duplex gap of the frequency band is a below a threshold and/or transmission power of the second network node is above threshold, selects two or more Global System for Mobile communication carriers in the second network node for performing a frequency hopping on the selected two or more Global System for Mobile communication carriers, which are located within a certain distance from a wide bandwidth carrier in a frequency domain.

According to an example aspect of the technology disclosed herein, when the transmitter inter-modulation levels exceed a threshold and the duplex gap of the frequency band is below threshold, the method in the first network node further comprises the act or step of selecting two or more GSM carriers in the MSR base station for performing frequency hopping on selected GSM carriers wherein the selected GSM carriers are located closer to the wide bandwidth carrier in the frequency domain.

Methods for Selecting GSM Carriers in MSR for Frequency Hopping

In GSM the frequency hopping is used. The pseudo random hopping sequence and the corresponding GSM carriers, which are hopped are configured by the higher layer, e.g., by the first network node such as BSC.

According to this aspect of the technology disclosed herein the first network node selects the set of GSM carriers for the frequency hopping while taking into account:
  Inter-modulation levels of MSR carriers.
  Duplex gap of the operating frequency band of the MSR node.
  Location or proximity of the GSM carriers.

The first network node may also take into account the state of the art criteria or measures when selecting the GSM carriers for the frequency hopping. Example of the state of the art measures used for the frequency hopping are the UE measurements such as the signal quality or signal strength of the GSM carriers. Specific examples are GSM carrier received signal strength indicator (RSSI) measurement, GSM BS identification code (BSIC) measurement, etc.

The manner in which the IM indicator, duplex gaps and location in frequency domain are considered for selecting the GSM carriers for the frequency hopping is further elaborated. For example if the IM indicator of the MSR carrier exceed a threshold and the duplex gap of the frequency band is below threshold, the method in the first network node further comprises the act or step of selecting two or more GSM carriers in the MSR node for performing the frequency hopping on the selected GSM carriers which are located closer to the wide bandwidth carrier in the frequency domain.

A GSM carrier can be considered closer to the wide bandwidth carrier if it is located within certain distance in frequency domain from at least one wide bandwidth carrier.

Action 1404.

The first network node, such as the RNC 15, may, when a level of intermodulation indicated by the indicator exceeds a threshold and/or the duplex gap of the frequency band is a below a threshold and/or transmission power of the second network node is above a threshold, select a carrier of the second network node for admitting a user equipment 10,20 to, by taking into account or based on the indicator. The first network node may additionally or alternatively select a narrow bandwidth carrier of the second network node for admitting a user equipment to the selected narrow bandwidth carrier which is located within a certain distance from a wide bandwidth carrier in a frequency domain.

According to an example aspect of the technology disclosed herein, when the transmitter inter-modulation levels exceed a threshold and the duplex gap of the frequency band is below threshold, a method in the first network node further comprises the acts or steps of: Selecting the narrow bandwidth MSR carrier (e.g., GSM carrier(s)) for admitting users to e.g. the MSR BS wherein the selected MSR narrow bandwidth carrier is located closer to the wide bandwidth carrier in the frequency domain of the MSR BS; or Selecting narrow bandwidth carriers of the second network node closer to each in case only narrow bandwidth carriers are allocated.

Methods for Selecting MSR Carrier for Admission Control

When assigning or selecting one or more MSR carriers of the MSR node to the UE or to any wireless or target device, at least the impact of the IM level of the MSR node is taken into account by the assigning node. The assigning node is the first network node which has the information about the impact of IM indicator of at least the serving MSR node, e.g., RNC or serving MSR BS. The first network node may also consider duplex gap of the frequency band when selecting the MSR carrier. The first network node may also take into account other prior art information or measures, e.g., cell load, target QoS or similar, when assigning the MSR carrier. After selecting the MSR carrier, the first network node may assign specific cell on the selected carrier to the admitted user equipment (UE) or wireless terminal.

Methods for Selecting any MSR Carrier

This aspect of the technology disclosed herein discloses the general rule for selecting any MSR carrier, which may be wide bandwidth or narrow bandwidth or may belong to any RAT, etc. The method in the first network node comprises the acts or steps of selecting the MSR carrier for admitting a UE (i.e. new or existing UE) by taking into account at least two MSR characteristics comprising of: MSR radio emission characteristics of the MSR carriers such as impact of the IM indicator; and Operating band characteristics of MSR frequency bands such as duplex gap of band. The MSR carrier selection may also take into account one or more prior art characteristics or performance measures such as cell load, etc.

Methods for Selecting Narrow Bandwidth MSR Carrier for Admission Control

According to this aspect of the technology disclosed herein special rules are disclosed for the selection of the narrow bandwidth MSR carriers of the second network node 13. In some cases the selection of narrow bandwidth MSR carrier may be unavoidable.

Examples of narrow bandwidth MSR carrier are GSM carrier (200 KHz), LTE carrier with smaller BWs, e.g., 1.4 MHz or 3 MHz.

Examples of wide bandwidth MSR carrier are GSM carrier (5 MHz), LTE carrier with larger BWs, e.g., 5, 10, 15 or 20 MHz.

According to this embodiment if the IM level of the MSR carrier exceeds a threshold or becomes severe as depicted by the IM indicator and the duplex gap of the frequency band is below threshold, the method of selecting the narrow bandwidth carrier in the first network node comprises the acts or steps of selecting the narrow bandwidth MSR carrier for admitting UE to the selected carrier by taking into account the location of the selected narrow bandwidth MSR carrier.

For example the first network node may select the MSR narrow bandwidth carrier which is located closer to at least one wide bandwidth carrier in the frequency domain or which is within certain distance in frequency domain from at least one wide bandwidth carrier.

According to some embodiments the first network node selects a carrier of the second network node for admitting a user equipment 10 to, based on degree of impact of the inter-modulation as indicated by the received indicator. Furthermore, the first network node may select a carrier of the second network node or another network node for performing hand over of a user equipment 10,20 to, based on the received indicator.

MSR radio emission characteristics: Consideration of these MSR characteristics means that the MSR carrier which leads to or has lower impact of the IM as depicted by the received IM indicator is selected. The lower impact of the IM means that the receiver performance does not degrade below certain threshold. The first network node may take into account the received IM indicator of the serving MSR node when selecting the carrier. The first network node may also take into account the impact of IM indicator of at least one neighboring MSR node; the neighboring node may be the closest to the serving node or the node from which the UE receives the signal above threshold.

Operating frequency band characteristic: This MSR frequency band means that any MSR carrier may be selected by the first network node in case the duplex gap of the MSR band is very large i.e. duplex gap is above threshold (e.g., 100 MHz or above). If the duplex gap of the MSR band is below threshold then the MSR carrier having low impact due to IM as depicted by the IM indicator is selected for admitting UE.

Action 1405.

The first network node may, when a level of intermodulation indicated by the indicator exceeds a threshold and/or the duplex gap of the frequency band is a below a threshold and/or transmission power of the second network node is above a threshold, deactivate one or more carriers of the second network node influenced by the indicated inter modulation. According to an example aspect of the technology disclosed herein, when the impact of transmitter inter-modulation (IM) on the receiver performance is severe and the duplex gap is below threshold, the method in the first network node comprises the acts or steps of: Deactivating one or more MSR carrier; and Reactivating the previously deactivated MSR carrier when the impact of the passive transmitter inter-modulation on the receiver degradation is low or negligible. Methods for Selectively Deactivating/Activating MSR Carriers In prior art a carrier belonging to the MSR node or to any node such as multi-carrier BS may be deactivated or activated based on prior art parameters such as traffic load, number of users, throughput, etc. In prior art the carrier may also be deactivated for saving energy, etc. According to this aspect of the technology disclosed herein the method in the first network node of activating or deactivating the carrier of the second network node 13 is based on: Inter-modulation levels of MSR carriers; and duplex gap of the operating frequency band of the e.g. MSR node. The use of the above factors is further elaborated. When the IM indicator of e.g. an MSR carrier depicts degradation of the receiver performance and the duplex gap of the MSR band is below threshold, then the method in the first network node may comprise the actions or steps of: Deactivating one or more MSR carrier. Reactivating the previously deactivated MSR carrier when the IM indicator indicates that the impact on the receiver performance is low or below threshold. In addition to the above factors, e.g. the IM indicator and duplex gap, the first network node may also take into account one or more of the following when activating or deactivating a MSR carrier: State of the art criteria or measures such as load, traffic characteristics on the MSR carrier. Examples of the state of the art measures or criteria are traffic load such as buffer size, number of active or connected users, carrier throughput or bit rate. Example of traffic characteristics are type of service, priority level of users, etc. Carrier BW i.e. whether it is narrow bandwidth or wide bandwidth. Location or proximity of the carriers and in particular of the narrow bandwidth carriers may also be taken into account.

The consideration of the above factors by the first network node for activating/deactivating MSR carriers are explained with several examples:

Example #1 in which the traffic load on a particular MSR carrier (C1) is low and the IM indicator corresponding to the MSR BW or MSR operating spectrum block indicates that receiver degradation is low and the duplex gap is smaller then the first network node may deactivate the carrier C1.

Example #2 in which there are two such MSR carriers (C1 and C2) with similar load where the BW of the C2 (C2 BW=1.4 MHz) is smaller than that of the C1 (C1 BW=5 MHz). In this case the first network node may deactivate the carrier C2 since C2 typically leads to generation of IM, which degrades the receiver performance.

Example #3 in which there are three such MSR carriers (C1, C2 and C3) with similar load. The BWs of the C3 is equal to that of C2 (i.e. BW=1.4 MHz). However C2 and C3 are located at different distances in frequency domain from the wide bandwidth carrier; compared to the carrier C2, the C3 is located further from the wide band carrier. In this example the first network node may deactivate the carrier C3 since C3 typically causes larger IM due to being both narrow bandwidth and also being far from the wide bandwidth carrier. The first network node may even deactivate both C2 and C3 carrier in case the IM indicator depicts possible receiver degradation.

The deactivated carriers or some of the deactivated in the above examples are activated by the first network node when the IM indicator depicts no or small receiver degradation over the MSR BW.

Action 1406.

The first network node, such as the RNC 15, may when the indicator depicts possible receiver degradation, lower a maximum output power of at least one carrier below a threshold of the second radio network node 13 when the first network node is the RNC 15.

Action 1407.

The first network node, such as the RNC 15, may alternatively or additionally limit a use of number of channels below a threshold for the second network node 13 when the first network node is the RNC 15. Thus, according to another aspect of this part of the technology disclosed herein, the first network node may, instead of completely deactivating the MSR carrier, take restricted actions in order to reduce or minimize the IM indicator over the MSR BW or over the spectrum block. When the IM indicator depicts possible receiver degradation then the restricted actions may comprise of one of the following:

Lower the maximum output power of at least one MSR carrier below a threshold of the second network node, where the carrier can be any carrier or a specific carrier such as narrow bandwidth carrier or the one far from the wide bandwidth carrier, etc.

Limit the use of the number of channels, e.g., resource blocks (RB), channelization codes or similar, below a threshold of the second network node.

When the IM indicator reveals no or small receiver degradation then the first network node may restore the carrier under restricted state to the normal or default level, e.g., full max output power, use of all channels, etc.

The first network node may also perform combination of both selective activation/deactivation of carriers and restricted actions. For example when the impact of the transmitter IM level is high, e.g. expected MSR receiver degradation is severe, then one carrier can be deactivated and another one can be configured to operate under restrictions as described above.

In some embodiments the set of additional information comprises one or more of: a signal quality, a signal strength, a cell load, a traffic load, a quality of Service of the user equipment 10, a bit rate or a Signal to Noise Ration, SNR, requirement, and/or a transmit power required to serve the user equipment 10.

State of art characteristics: One or more state of art characteristics or measures or performance criteria or performance target may also be taken into account by the first network node when selecting the MSR carrier for the second network node. Examples of such criteria are: UE measurements such as signal quality or signal strength, cell load, traffic load, user QoS, traffic buffer size, bit rate or SNR requirements, BS transmit power required to serve the users, etc. For example if the required QoS or SNR for the user is low or moderate then MSR carrier even with moderate IM level can be selected. The reason is that such a new user will not significantly increase the IM of the selected carrier. On the other hand the UE with high bit rate/QoS requirement may require the serving MSR node to transmit with relatively high power on the selected MSR carrier. Hence for such UE the first network node should select the MSR carrier which has very low impact on the receiver due to the transmitter IM (i.e. IM indicator depicts no or small impact on receiver performance).

Examples of UE measurements are Common Pilot Indicator CHannel (CPICH) Received Signal Code Power (RSCP), CPICH Bit Energy-to-Noise Density (Ec/No), Reference Signal Received Power (RSRP), Reference Signal Received Quality (RSRQ), UE transmit power, UE power headroom, or similar. Examples of cell load measures are cell transmit power or carrier transmit power measurements, channel usage or channel used or channel utilization, RB usage, etc.

In some embodiments the first network node, such as the RNC 15, may, when an output power of the second network node 13,23 is below a certain threshold, allocate carriers over a maximum transmission bandwidth of the second network node. Thus, a whole bandwidth may be utilized as the output power is below the threshold and generating less IM. According to an example aspect of the technology disclosed herein when the output power is below a certain threshold, the method in the first network node comprises the acts or steps of allocating two or more carriers and in particular narrow bandwidth carriers, e.g., GSM carriers, up to the maximum transmission bandwidth of the MSR.

Methods for Allocating Carriers as a Function Output Power\

According to another aspect of the technology disclosed herein when the output power of the MSR node is below a certain threshold the first network node, which assigns the carriers to the UEs for transmission and reception, may allocate the carriers over the maximum transmission bandwidth of the MSR. The maximum output power can be the power per carrier or aggregated power or overall power of all carriers within the MSR BW of the MSR node. The aggregated power for example can be the average power of all carriers or any suitable performance measure.

When the output power is below threshold then the power of the IM products is also lower. This in turn also lowers the impact on the receiver of the MSR node i.e. receiver degradation is much lower. Hence under lower output power the allocation of carriers can be done more freely within the full allowed RF bandwidth of the MSR.

On the other hand when the output power of the MSR node increases above a certain threshold then the carriers and in particular the narrow bandwidth carriers have to be allocated by the first network node closer to each other. Hence under higher output power the currently used MSR bandwidth will be lower than the maximum allowed MSR bandwidth. In this way the receiver degradation due to the IM impact will be decreased. Hence the performance of the MSR BS receiver will not be degraded and the target quality can be maintained.

The first network node may be one of base station, RNC, BSC, eNode B, donor node or relay. The second network node is one of base station, eNode B, Node B or relay. Thus, the first network node may be any configuring or controlling node which has means to control or manage a multi-standard radio (MSR) node or receives an MSR IM indicator of other MSR nodes or capable of requesting MSR nodes to report their MSR IM indicator, e.g., RNC, BSC, SON, OSS, O&M, positioning node, network planning and configuring node, donor BS, core network node or the MSR node itself, etc. The second network node may be a multi-standard radio (MSR) node, e.g., MSR BS, MSR relay, donor MSR BS, etc. First network node" or "first node" is the target node, which receives the information of the IM indicator (e.g., from the second network node). The first network node may also be capable of managing and controlling the MSR node, e.g., RNC controlling the MSR base station. The first network node may also explicitly request the second network node to reports its IM indicator or related information. Examples of the first network node are RNC, BSC, BS, BTS, Node B, eNode B, positioning node (e.g., E-SMLC in LTE or SAS in HSPA), core network node, e.g., Mobility Management Entity (MME) in LTE, O&M node, OSS node, network management node, SON node, MSR node, MSR BS, MSR relay, donor MSR BS, donor BS, etc. Second network node" or "second node" is any MSR source node capable of signalling its IM indicator or related information to the first network node. Examples of the second network node are: MSR node, MSR BS, MSR relay, donor MSR BS, MSR wireless terminal such as UE, single carrier UE or multi-carrier/carrier aggregation UE, any MSR target device whose position is determined, dedicated wireless device assisting positioning determination, MSR based customer premises equipment (CPE), MSR based fixed wireless access (FWA) nodes, etc. Especially, the second network node may be a multi standard radio node. The second network node may comprise of any number of technologies, such as GSM, HSPA, LTE or CDMA2000.

Figure 15:
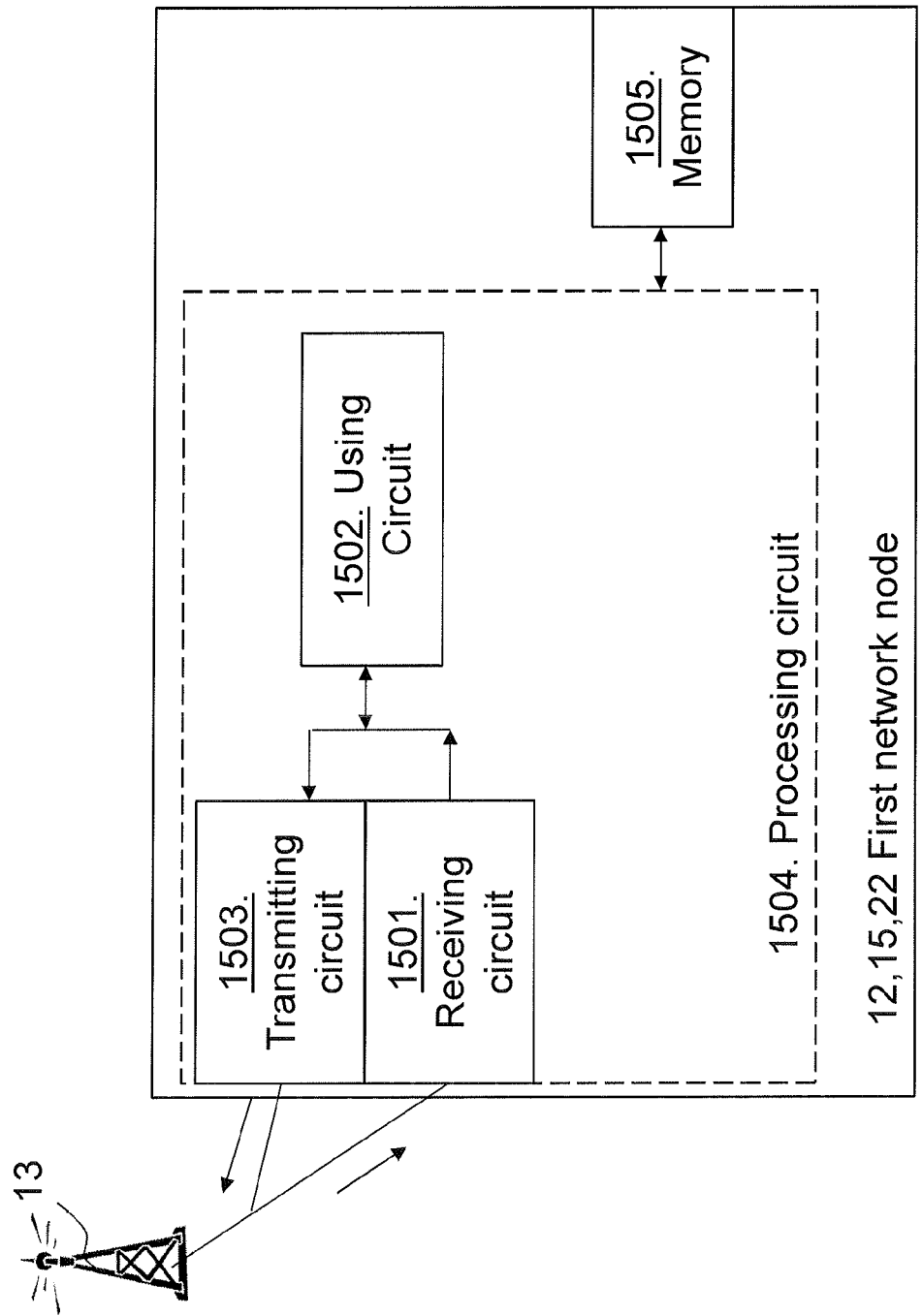
FIG. 15 is a block diagram depicting a first network node according to embodiments herein.

FIG. 15 is a block diagram depicting the first network node, such as the first radio base station 12, RNC 15, or the first base station 22, for performing radio resource management in a cellular radio system. The first network node comprises a receiving circuit 1501 configured to receive an indicator, from a second network node 13,23 in the cellular radio system. The indicator indicates an impact of an intermodulation caused by a transmission from a transmitter in the second network node on a receiver in the second network node.

The first network node further comprises a using circuit 1502 configured to use the received indicator for a radio resource management purpose. The using circuit 1502 may be configured to use additional set of information for the radio resource management purpose. The additional set of information may comprise a duplex gap of frequency band. The using circuit 1502 may further be configured to select, when a level of intermodulation indicated by the indicator exceeds a threshold and/or the duplex gap of the frequency band is a below a threshold and/or transmission power of the second network node is above threshold: a carrier of the second network node for admitting a user equipment 10,20 to, by taking into account the indicator; and/or a narrow bandwidth carrier of the second network node for admitting a user equipment to the selected narrow bandwidth carrier which is located within a certain distance from a wide bandwidth carrier in a frequency domain. In some embodiments the using circuit 1502 is configured to select a carrier of the second network node for admitting a user equipment 10,20 to, based on degree of impact of the intermodulation, or level of IM, as indicated by the received indicator. The using circuit 1502 may be configured to select a carrier of the second network node or another network node for performing hand over of a user equipment 10,20 to, based on the received indicator.

In some embodiments the using circuit 1502 may be configured to, when a level of intermodulation indicated by the indicator exceeds a threshold and/or the duplex gap of the frequency band is a below a threshold and/or transmission power of the second network node is above threshold, deactivate one or more carriers of the second network node influenced by the indicated inter modulation. In some embodiments the using circuit 1502 is configured to, when the indicator depicts possible receiver degradation, lower maximum output power of at least one carrier below a threshold of the second network node, and/or limit a use of number of channels below a threshold of the second network node.

In some embodiments the set of additional information may comprise one or more of: a signal quality, a signal strength, a cell load, a traffic load, a quality of Service of the user equipment 10,20, a bit rate or a Signal to Noise Ration, SNR, requirement, and/or a transmit power required to serve the user equipment 10,20.

The using circuit 1502 may in some embodiments be configured to, when a level of intermodulation indicated by the indicator exceeds a threshold and/or the duplex gap of the frequency band is a below a threshold and/or transmission power of the second network node is above threshold, select two or more Global System for Mobile communication carriers in the second network node for performing a frequency hopping on the selected two or more Global System for Mobile communication carriers, which are located within a certain distance from a wide bandwidth carrier in a frequency domain. In some embodiments the using circuit 1502 may be configured to, when an output power of the second network node is below a certain threshold, allocate carriers over a maximum transmission bandwidth of the second network node.

The radio resource management purpose may comprises at least one of: to perform admission control for admitting or rejecting a user equipment 10,20 on a carrier belonging to the second network node based on the received indicator; to perform a handover of a user equipment 10,20 to a carrier of the second network node 13,23 taking the indicator into account; to select a sequence of GSM carriers for frequency hopping; and/or to network plan taking the received indicator into account. In some embodiments the first network node may comprise a transmitting circuit configured to transmit data such as HO related data, admittance decision or similar to the second network node.

The embodiments herein for performing radio resource management in the cellular radio system may be implemented through one or more processors, such as a processing circuit 1504 in the first network node depicted in FIG. 15, together with computer program code for performing the functions and/or method steps of the embodiments herein. The program code mentioned above may also be provided as a computer program product, for instance in the form of a data carrier carrying computer program code for performing embodiments herein when being loaded into the first network node. One such carrier may be in the form of a CD ROM disc. It is however feasible with other data carriers such as a memory stick. The computer program code may furthermore be provided as pure program code on a server and downloaded to the first network node.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The first network node may further comprise a memory 1505 configured to be used to store data. The memory 1505 may comprise one or more memory units and may be used to store for example data such as indicators, radio resources, application to perform the methods herein when being executed on the first network node 12,15,22 and/or similar.

Figure 16:
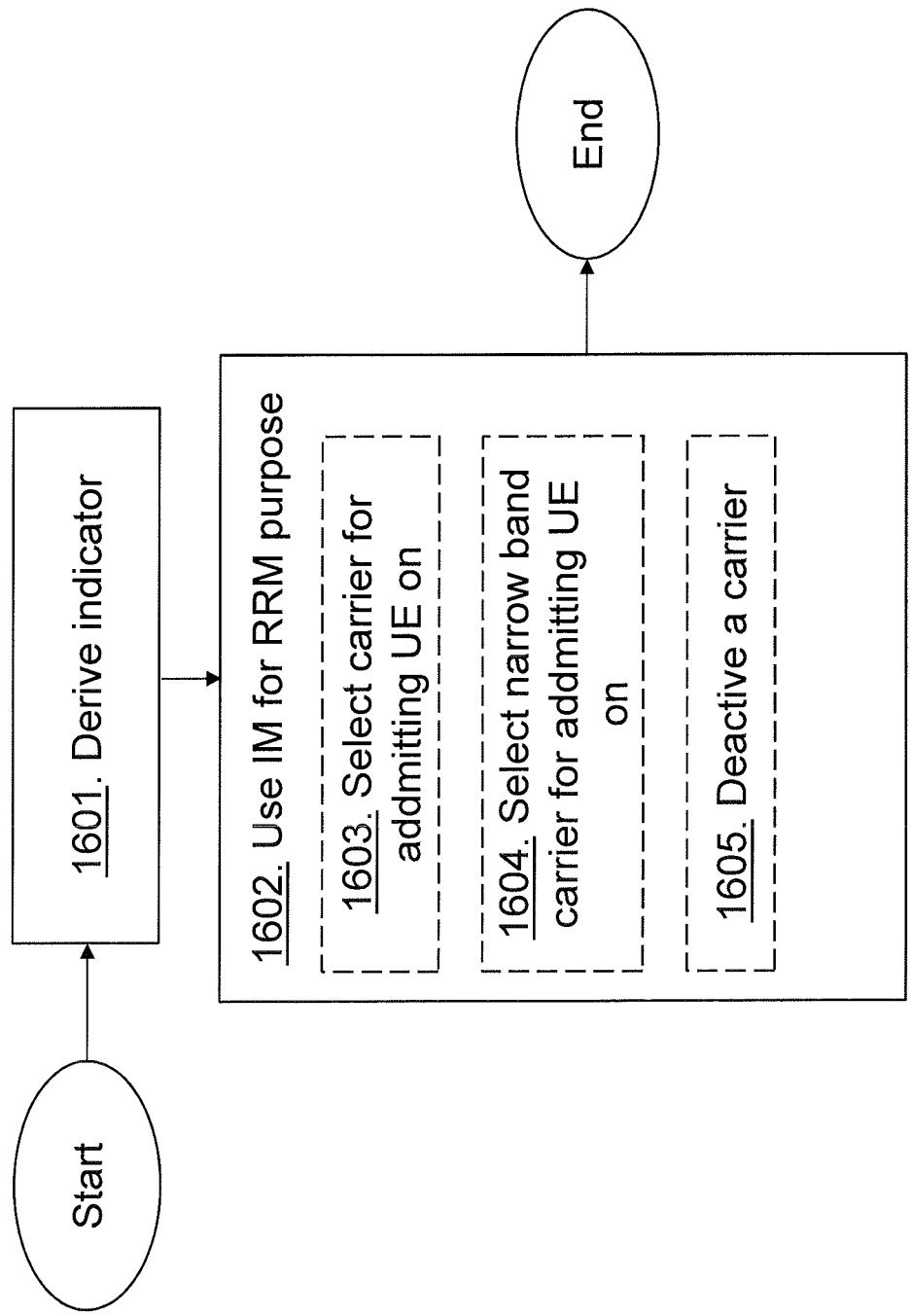
FIG. 16 is a schematic flow chart depicting a method in a second network node according to some embodiments herein.

Some method actions in the second network node, referred to as the second radio base station 13 and the second base station 23 in the figures above, for radio resource management in a cellular radio according to some general embodiments will now be described with reference to a flowchart depicted in FIG. 16. The steps do not have to be taken in the order stated below, but may be taken in any suitable order. Actions only performed in some embodiments are marked with a dashed box.

Action 1601.

The second network node derives an indication of an impact of an intermodulation caused by a transmission from a transmitter in the second network node on a receiver in the second network node.

Action 1602.

The second network node uses the derived indication performing radio resource management in the second network node.

Action 1603.

The second network node may e.g., when a level of the intermodulation indicated by the indicator exceeds a threshold, select a carrier of the second network node for admitting a user equipment to, by taking into account the indicator.

Action 1604.

Additionally or alternatively, the second network node selects a narrow bandwidth carrier of the second network node or admitting a user equipment to the selected narrow bandwidth carrier. The selected narrow bandwidth carrier is within a distance to a wide bandwidth carrier.

Action 1605.

Additionally or alternatively, the second network node deactivates one or more carriers of the second network node influenced by the intermodulation. Furthermore, the second node may perform locally possible steps mentioned in FIG. 14 taking its own IM into consideration.

Figure 17:
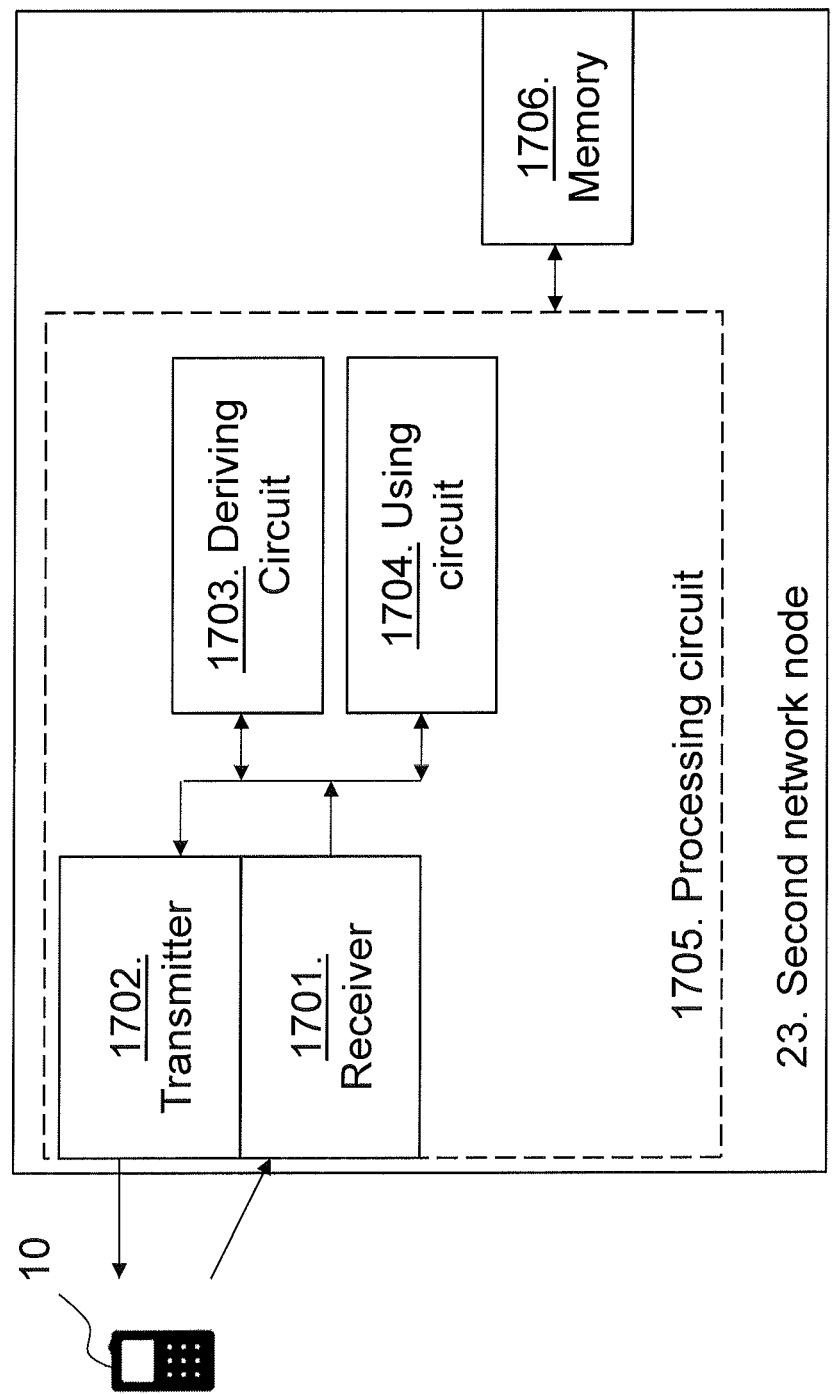
FIG. 17 is a block diagram depicting a second network node according to some embodiments herein.

FIG. 17 is a block diagram depicting a second network node adapted for radio resource management in a cellular radio system. The second network node comprises a receiver 1701 configured to receive a signal from the cellular radio system.

The second network node further comprises a transmitter 1702 configured to transmit a signal in the cellular radio system.

The second network node furthermore comprises a deriving circuit 1703 configured to derive an indication of an impact of an intermodulation caused by a transmission from the transmitter 1702 in the second network node on the receiver 1701 in the second network node.

Additionally, the second network node comprises a using circuit 1704 configured to use the derived indication for performing radio resource management in the second network node. In some embodiments the using circuit 1704 is configured, when a level of the intermodulation indicated by the indicator exceeds a threshold, to select a carrier of the second network node for admitting a user equipment to, by taking into account the indicator; and/or to select a narrow bandwidth carrier of the second network node for admitting a user equipment to the selected narrow bandwidth carrier, which selected narrow bandwidth carrier is within a distance to a wide bandwidth carrier, and/or to deactivate one or more carriers of the second network node influenced by the intermodulation.

The embodiments herein adapted for radio resource management in the cellular radio system may be implemented through one or more processors, such as a processing circuit 1705 in the second network node depicted in FIG. 17, together with computer program code for performing the functions and/or method steps of the embodiments herein. The program code mentioned above may also be provided as a computer program product, for instance in the form of a data carrier carrying computer program code for performing embodiments herein when being loaded into the second network node. One such carrier may be in the form of a CD ROM disc. It is however feasible with other data carriers such as a memory stick. The computer program code may furthermore be provided as pure program code on a server and downloaded to the second network node.

Those skilled in the art will also appreciate that the various "circuits" described may refer to a combination of analogue and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The second network node may further comprise a memory 1706 configured to be used to store data. The memory 1706 may comprise one or more memory units and may be used to store for example data such as indicators, radio resources, application to perform the methods herein when being executed on the second network node and/or similar.

Figure 18:
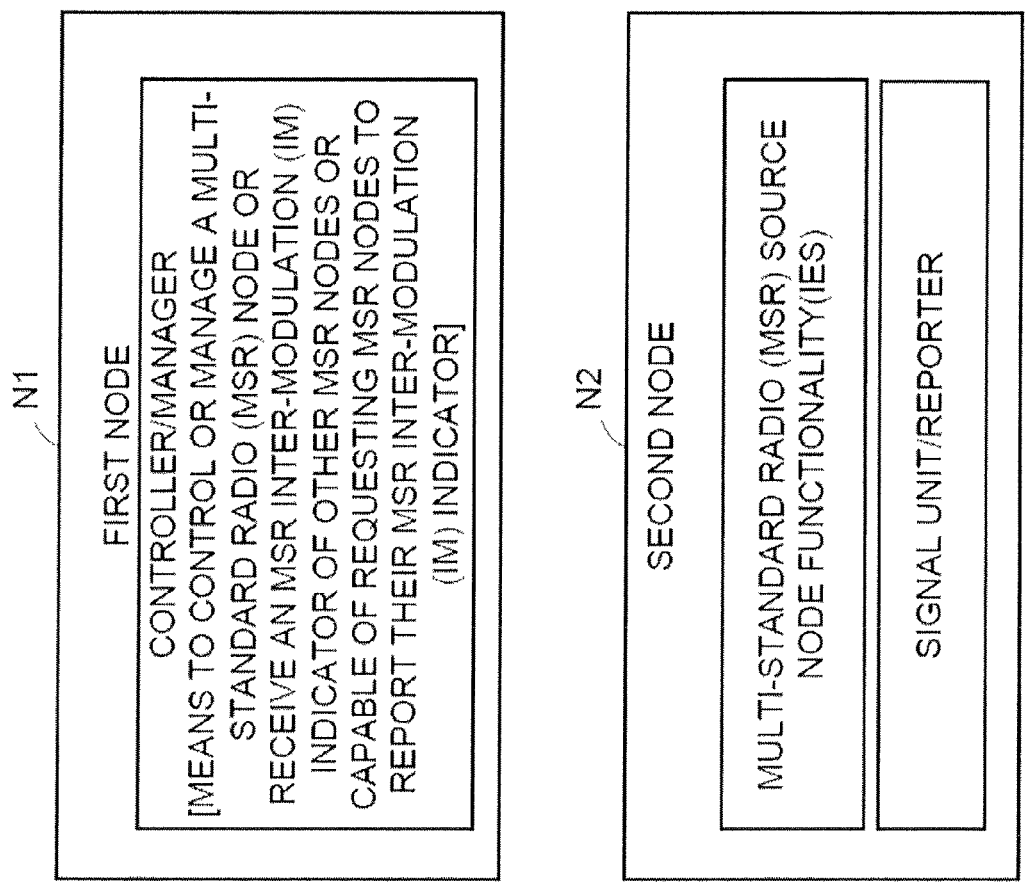
FIG. 18 is a schematic view showing portions of an example communications system including example embodiments of a first node and a second node.

FIG. 18 shows portions of an example communications system including example embodiments the aforementioned first network node (first node) N1 and second network node (second node) N2. As shown in FIG. 18, the first node N1 comprises, e.g., a controller or manager configured to control or manage a multi-standard radio (MSR) node or receives an MSR IM indicator of other MSR nodes or capable of requesting MSR nodes to report their MSR IM indicator. In the non-limiting example embodiment of FIG. 18 the second node N2 is shown as including multi-standard radio (MSR) source node functionality(ies) and a signal unit/reporter.

Figure 19:
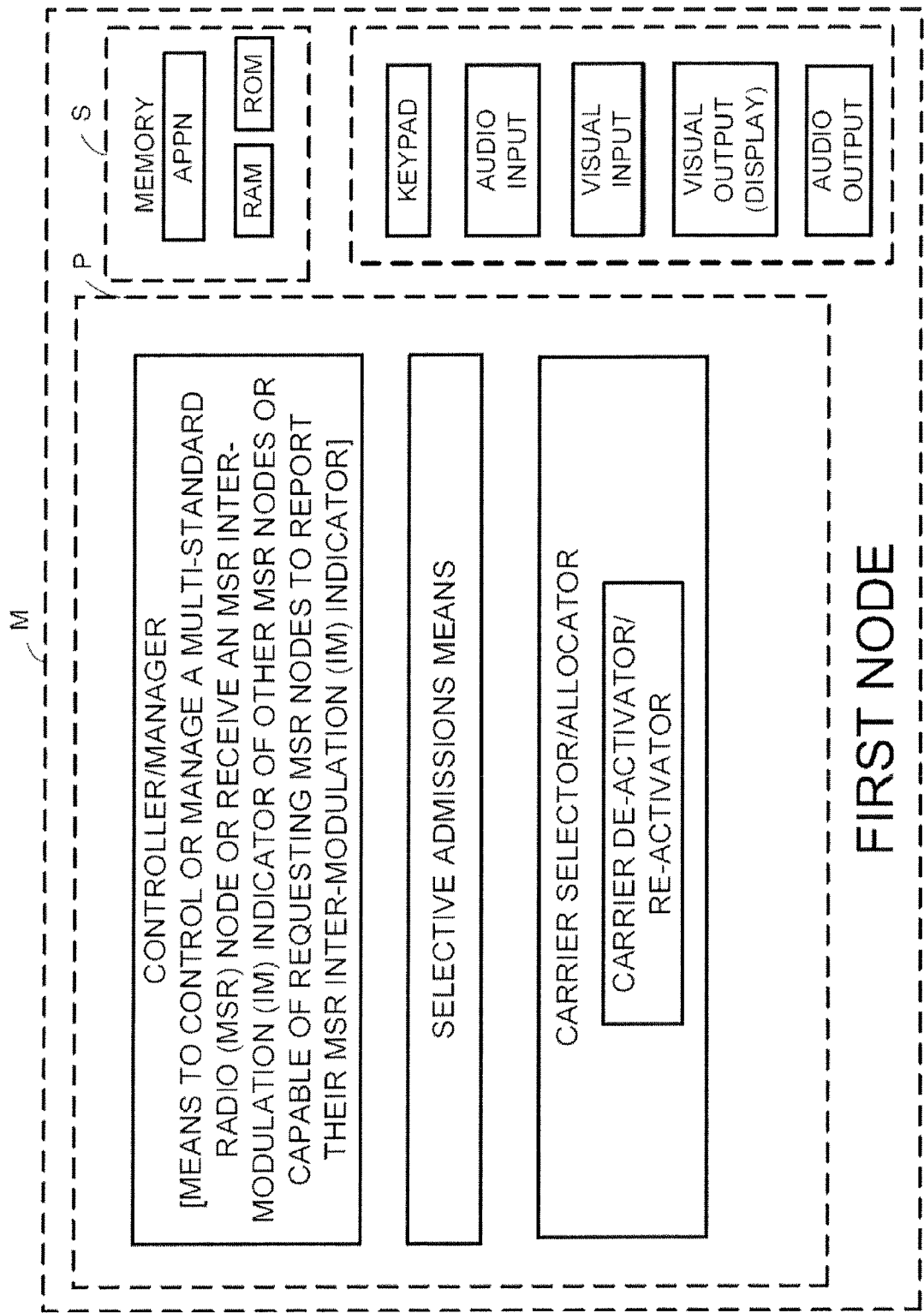
FIG. 19 is a schematic view showing in more detail another example, non-limiting embodiment of a first node.

FIG. 19 illustrates in more detail selected portions of another example, non-limiting embodiment of first node N1, called first network node 12,15,22 above. FIG. 19 again shows the controller/manager similar to that of FIG. 18, and in addition illustrates a selective admission means and carrier selector/allocator. In an example implementation the carrier selector/allocator may include carrier de-activator/re-activator, whose functions are understood from a preceding embodiment. The selective admission means and the carrier selector/allocator may be encompassed or included in the controller/manager.

FIG. 19 also illustrates that certain units or functionalities of first node N1 may optionally be implemented in an example optional platform or machine implementation. For example FIG. 19 illustrates that the manager/controller and other functionalities of FIG. 19 may be provided on a machine platform M. The machine platform M may any of several forms, such as (for example) a computer implementation platform or electronic circuit or hardware circuit platform. FIG. 19 particularly shows machine platform M as being a computer platform wherein logic and functionalities of the controller/manager are implemented by one or more computer processors or controllers P as those terms are herein expansively defined. In such a computer implementation the machine platform M may comprise, in addition to a processor(s) M, memory section S (which in turn may comprise random access memory; read only memory; and application memory (which stores, e.g., coded instructions which may be executed by the processor to perform acts described herein); and any other memory such as cache memory, for example).

Figure 20:
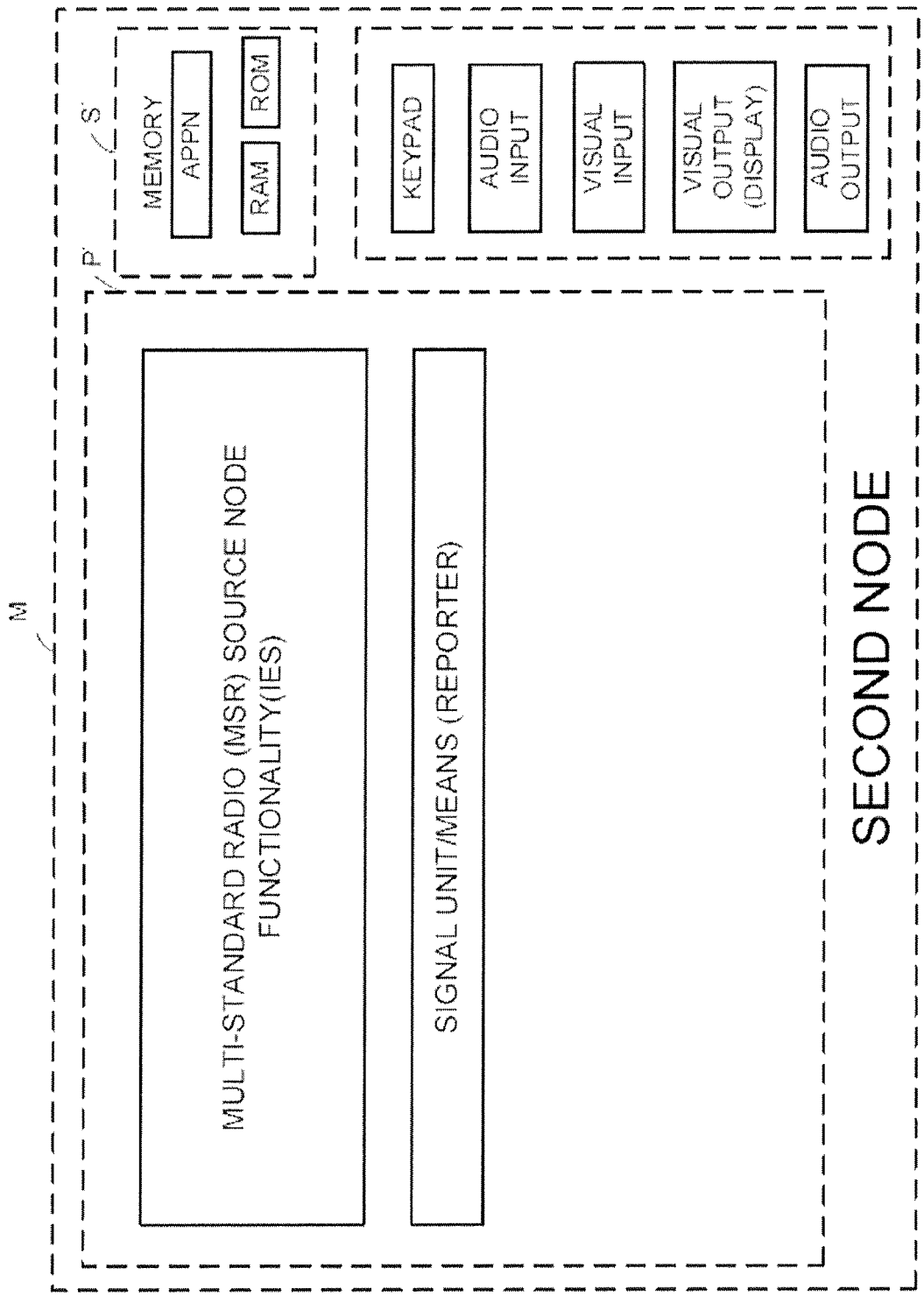
FIG. 20 is a schematic view showing in more detail another example, non-limiting embodiment of a second node.

In similar manner, FIG. 20 shows selected portions of second node N2, called second network node 13,23 above. FIG. 20 also illustrates that second node N2 may also optionally comprise a platform M'. The platform M' of second node N2 may also take several forms, such as (for example) a computer implementation platform or a hardware circuit platform. FIG. 20 particularly shows machine platform M' as being a computer platform wherein certain logic and functionalities of second node N2 are implemented by one or more computer processors or controllers P' as those terms are herein expansively defined. In such a computer implementation the machine platform M' may also comprise, in addition to a processor(s) P', memory section S'.

Some embodiments herein relate to a network nodes such as MSR base stations. Examples of radio nodes other than the base station which may be based on multi-standard radio (MSR) principles are: relay node, which may have different power classes, e.g., indoor, pico, thruwall, micro, pico and home base-stations, wireless terminal, e.g., user equipment, FDA, customer premises equipment (CPE), fixed wireless access (FWA) nodes, repeaters, e.g., Layer-1 and Layer-2 repeaters, any target device whose position or location is to be determined, wireless devices to assistant location services by receiving signals from and transmitting signals towards target devices, whose location is determined, or similar. This means that for instance relay or any other MSR based node may comprise of any combination of RATs, i.e. can be multi-RATs and/or multi-carrier, e.g., relay based on MSR containing UTRA FDD and E-UTRA FDD. The relay may also be contiguous or NC-MSR. Similar to relay or repeaters, the CPE and FWA are also used for coverage enhancements primarily in local areas.

Furthermore the MSR relay may be in-band relay and out-band relay. In in-band relay the backhaul link and the access link operate using the same carrier frequency. In outband relay the backhaul link and the access link operate using different carrier frequencies. The carrier frequencies may belong to the same or different frequency bands.

The MSR relay may also be mobile relay, e.g., deployed in a movable vehicle to mainly serve users inside the vehicle and also outside, or a fixed relay. A wireless terminal may also serve as relay.

The MSR relay may also support carrier aggregation (CA) or multi-carrier, e.g., intra-RAT carrier aggregation (CA) or multi-RAT carrier aggregation (CA).

The MSR relay may operate in the single hop relay system or in a multi-hop relay system.

The technology disclosed herein is applicable to all the nodes described above including the base station.

In the description above, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware, e.g., digital or analog, circuitry including but not limited to application specific integrated circuit(s) (ASIC), and, where appropriate, state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

While abbreviations utilized herein are believed to be within the knowledge of the person skilled in the art, the following list may be helpful:
   3GPP 3rd Generation Partnership Project
   BS Base Station
   eNodeB evolved Node B
   E-SMLC Evolved SMLC
   BSIC BS identification code
   LTE Long-Term Evolution
   RRC Radio Resource Control
   SMLC Serving Mobile Location Center
   UE User Equipment
   UMTS Universal Mobile Telecommunications System
   RN Relay node
   RNC Radio link controller
   BSC BS controller
   HSPA High speed packet access
   HRPD High rate packet data
   SAS Stand-Alone-Serving mobile location center
   MME Mobility management entity
   SON Self Organizing Network
   OSS Operational Support Systems
   O&M Operation and Maintenance
   MSR Multi-standard radio
   LPP LTE positioning protocol
   LPPa LTE positioning protocol annex
   CPE Customer premises equipment
   FWA Fixed wireless access While the subject matter described herein is believed to be understandable to the person skilled in the art, the following references may be helpful and are incorporated herein by reference in their entirety:
   3GPP TS 37.104, version 9.3.0 "E-UTRA, UTRA and GSM/EDGE; Multi-Standard Radio (MSR) Base Station (BS) radio transmission and reception".
   RP-100689, "Multi-standard radio Base Station RF requirements for non-contiguous spectrum deployments". WID, TSG-RAN#48

Although the description above comprises much specificity, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method in a second radio base station for enabling radio resource management in a cellular radio system, the method comprising:
   signalling an indicator to a first radio base station or a controlling node in the cellular radio system, indicating a level of an intermodulation caused by a transmission from a transmitter in the second radio base station on a receiver in the second radio base station; and
   reporting additional information for a configuration of the second radio base station to enable the first radio base station or the controlling node to interpret the signalled indicator, wherein the additional information comprises one or more of: spectrum block size, number of spectrum blocks, types of radio access technologies, and number of radio access technologies.

2. The method according to claim 1, further comprising: deriving the indicator based on statistical measurements or information obtained over time.

3. The method according to claim 1, wherein the indication is a multi-level indicator or a real value indicator.

4. The method according to claim 1, wherein the signalling is performed upon request from the first radio base station or the controlling node or proactively.

5. The method according to claim 1, wherein the second radio base station comprises non-contiguous blocks of frequency spectrums or carriers.

6. The method according to claim 1, wherein the intermodulation is passive intermodulation generated due to a non-linear characteristic of a passive radio frequency component used in the transmitter of the second radio base station.

7. A method in a first radio base station or a controlling node for performing radio resource management in a cellular radio system, the method comprising:
   receiving an indicator, from a second radio base station in the cellular radio system, indicating a level of an intermodulation caused by a transmission from a transmitter in the second radio base station on a receiver in the second radio base station; and
   using the received indicator for a radio resource management purpose, which comprises one or more of:
      adjusting maximum output power of at least one carrier of the second radio base station; and
      adjusting a use of number of channels of the second radio base station, wherein the using the received indicator for the radio resource management purpose further comprises: when the level of intermodulation indicated by the indicator exceeds a first threshold or a duplex gap of a frequency band supporting the second base station is below a second threshold or transmission power of the second radio base station is above a third threshold, selecting two or more Global System for Mobile (GSM) communication carriers in the second radio base station for performing frequency hopping on the selected two or more GSM carriers.

8. The method according to claim 7, wherein the using further comprises using an additional set of information for the radio resource management purpose.

9. The method according to claim 8, wherein the additional set of information comprises a duplex gap of frequency band.

10. The method according to claim 9, wherein the using further comprises, when the level of intermodulation indicated by the indicator exceeds a threshold or the duplex gap of the frequency band is a below a threshold or a transmission power of the second radio base station is above threshold, one or more of:
    selecting a carrier of the second radio base station for admitting a user equipment by taking into account the indicator; and
    selecting a narrow bandwidth carrier of the second radio base station for admitting a user equipment to the selected narrow bandwidth carrier which is located within a certain distance from a wide bandwidth carrier in a frequency domain.

11. The method according to claim 7, wherein the using further comprises:
    selecting a carrier of the second radio base station for admitting a user equipment based on degree of impact of the intermodulation as indicated by the received indicator.

12. The method according to claim 7, wherein the using comprises:
    selecting a carrier of the second radio base station or another network node for performing hand over of a user equipment based on the received indicator.

13. The method according to claim 7, wherein the using further comprises, when the level of intermodulation indicated by the indicator exceeds a threshold or the duplex gap of the frequency band is a below a threshold or transmission power of the second radio base station is above threshold,
    deactivating one or more carriers of the second radio base station influenced by the indicated intermodulation.

14. The method according to claim 7, wherein the using comprises, when the indicator depicts possible receiver degradation, one or more of:
    lowering maximum output power of at least one carrier below a threshold of the second radio base station; and
    limiting a use of a number of channels below a threshold of the second radio base station.

15. The method according to claim 7, wherein the set of additional information comprises one or more of: a signal quality, a signal strength, a cell load, a traffic load, a quality of Service of the user equipment, a bit rate or a Signal to Noise Ration, SNR, requirement, and a transmit power required to serve the user equipment.

16. The method according to claim 7, wherein the selected two or more GSM communication carriers are located within a certain distance from a wide bandwidth carrier in a frequency domain.

17. The method according to claim 7, wherein the radio resource management purpose comprises at least one of: performing admission control for admitting or rejecting a user equipment on a carrier belonging to the second radio base station based on the received indicator; performing a handover of a user equipment to a carrier of the second radio base station taking the indicator into account; selecting a sequence of GSM carriers for frequency hopping; and network planning taking the received indicator into account.

18. The method according to claim 7, wherein the using further comprises, when an output power of the second radio base station is below a certain threshold,
    allocating carriers over a maximum transmission bandwidth of the second radio base station.

19. A second radio base station for enabling radio resource management in a cellular radio system, wherein the second radio base station comprises:
    a transmitter;
    a receiver;
    a transmitting circuit configured to signal an indicator to a first radio base station or a controlling node in the cellular radio system, indicating a level of an intermodulation caused by a transmission from the transmitter in the second radio base station on the receiver in the second radio base station; and
    a reporting circuit configured to report additional information for a configuration of the second radio base station to enable the first radio base station or the controlling node to interpret the signalled indicator, wherein the additional information comprises one or more of: spectrum block size, number of spectrum blocks, types of radio access technologies, and number of radio access technologies.

20. The second radio base station according to claim 19, further comprising:
    a deriving circuit configured to derive the indicator based on statistical measurements or information obtained over time.

21. The second radio base station according to claim 19, wherein the indication is a multi-level indicator or a real value indicator.

22. The second radio base station according to claim 19, wherein the signalling circuit is further configured to perform the signalling upon request from the first radio base station or the controlling node or proactively.

23. The second radio base station according to claim 19, wherein the second radio base station comprises non-contiguous blocks of frequency spectrums or carriers.

24. The second radio base station according to claim 19, wherein the intermodulation is passive intermodulation generated due to a non-linear characteristic of a passive radio frequency component used in the transmitter of the second radio base station.

25. A first radio base station or a controlling node for performing radio resource management in a cellular radio system, comprising:
   a receiving circuit configured to receive an indicator, from a second radio base station in the cellular radio system, which indicator indicates a level of an intermodulation caused by a transmission from a transmitter in the second radio base station on a receiver in the second radio base station; and
   a using circuit configured to use the received indicator for a radio resource management purpose, wherein the using circuit is configured to adjust one or more of:
   a maximum output power of at least one carrier below a threshold, of the second radio base station and a use of number of channels below a threshold of the second radio base station, wherein the using circuit is further configured to: when the level of intermodulation indicated by the indicator exceeds a first threshold or a duplex gap of a frequency band supporting the second base station is below a second threshold or transmission power of the second radio base station is above a third threshold, select two or more Global System for Mobile (GSM) communication carriers in the second radio base station for performing frequency hopping on the selected two or more GSM carriers.

26. The first radio base station or a controlling node according to claim 25, wherein the using circuit is configured to use an additional set of information for the radio resource management purpose.

27. The first radio base station or a controlling node according to claim 26, wherein the additional set of information comprises a duplex gap of frequency band.

28. The first radio base station or a controlling node according to claim 27, wherein the using circuit is further configured to select, when the level of intermodulation indicated by the indicator exceeds a threshold or the duplex gap of the frequency band is a below a threshold or a transmission power of the second radio base station is above threshold, one or more of:
   a carrier of the second radio base station for admitting a user equipment by taking into account the indicator; and
   a narrow bandwidth carrier of the second radio base station for admitting a user equipment to the selected narrow bandwidth carrier which is located within a certain distance from a wide bandwidth carrier in a frequency domain.

29. The first radio base station or a controlling node according to claim 25, wherein the using circuit is configured to select a carrier of the second radio base station for admitting a user equipment based on a degree of impact of the intermodulation as indicated by the received indicator.

30. The first radio base station or a controlling node according to claim 25, wherein the using circuit is configured to select a carrier of the second radio base station or another network node for performing hand over of a user equipment based on the received indicator.

31. The first radio base station or a controlling node according to claim 25, wherein the using circuit is configured to, when the level of intermodulation indicated by the indicator exceeds a threshold or the duplex gap of the frequency band is a below a threshold or a transmission power of the second radio base station is above threshold, deactivate one or more carriers of the second radio base station influenced by the indicated inter modulation.

32. The first radio base station or a controlling node according to claim 25, wherein the using circuit is configured to, when the indicator depicts possible receiver degradation, perform one or more of:
   lowering a maximum output power of at least one carrier below a threshold of the second radio base station and limiting a use of number of channels below a threshold of the second radio base station.

33. The first radio base station or a controlling node according to claim 25, wherein the set of additional information comprises one or more of: a signal quality, a signal strength, a cell load, a traffic load, a quality of Service of the user equipment, a bit rate or a Signal to Noise Ration, SNR, requirement, and a transmit power required to serve the user equipment.

34. The first radio base station or a controlling node according to claim 25, wherein the selected two or more GSM communication carriers are located within a certain distance from a wide bandwidth carrier in a frequency domain.

35. The first radio base station or a controlling node according to claim 25, wherein the radio resource management purpose comprises at least one of: to perform admission control for admitting or rejecting a user equipment on a carrier belonging to the second radio base station based on the received indicator; to perform a handover of a user equipment to a carrier of the second radio base station taking the indicator into account; to select a sequence of GSM carriers for frequency hopping; and to network plan taking the received indicator into account.

36. The first radio base station or a controlling node according to claim 25, wherein the using circuit is configured to, when an output power of the second radio base station is below a certain threshold, allocate carriers over a maximum transmission bandwidth of the second radio base station.

* * * * *